US009836271B2

(12) United States Patent
Cameron et al.

(10) Patent No.: US 9,836,271 B2
(45) Date of Patent: Dec. 5, 2017

(54) DELIVERY OF SYNCHRONISED SOUNDTRACKS FOR ELECTRONIC MEDIA CONTENT

(71) Applicant: Booktrack Holdings Limited, Takapuna (NZ)

(72) Inventors: Paul Charles Cameron, Milford (NL); Mark Steven Cameron, Discovery Bay (HK); Craig Andrew Wilson, Rothesay Bay (NZ); Mark Anthony Buer, Glenholme (NZ)

(73) Assignee: Booktrack Holdings Limited, Takapuna Auckland (NZ)

( * ) Notice: Subject to any disclaimer, the term of this patent is extended or adjusted under 35 U.S.C. 154(b) by 213 days.

(21) Appl. No.: 14/332,521

(22) Filed: Jul. 16, 2014

(65) Prior Publication Data

US 2015/0025663 A1 Jan. 22, 2015

Related U.S. Application Data

(60) Provisional application No. 61/847,266, filed on Jul. 17, 2013.

(51) Int. Cl.
*G06F 17/00* (2006.01)
*G06F 3/16* (2006.01)
(Continued)

(52) U.S. Cl.
CPC ........ *G06F 3/165* (2013.01); *G06F 17/30746* (2013.01); *G11B 27/005* (2013.01);
(Continued)

(58) Field of Classification Search
CPC ............. H04N 21/233; H04N 21/2335; H04N 21/2343; H04N 21/44218; H04N 21/6582;
(Continued)

(56) References Cited

U.S. PATENT DOCUMENTS 8,825,490 B1* 9/2014 Weinstein ........ H04N 21/44213
  704/270
2010/0050064 A1* 2/2010 Liu ..................... G06F 17/2765
  715/202

(Continued)

FOREIGN PATENT DOCUMENTS

EP 2179860 4/2010
WO WO-96/07999 3/1995
(Continued)

OTHER PUBLICATIONS

"European Application No. 14177407.5, Extended European Search Report dated May 4, 2015", (May 4, 2015), 16 pgs.
(Continued)

*Primary Examiner* — Fan Tsang
*Assistant Examiner* — David Siegel
(74) *Attorney, Agent, or Firm* — Schwegman Lundberg & Woessner, P.A.

(57) ABSTRACT

A method and system for streaming a soundtrack from a server to a remote user device for a reader of electronic media content. The soundtrack is defined by multiple audio regions. Each audio region defined by an audio track for playback in the audio region, a start position in the electronic media content corresponding to where the playback of the audio region is to begin, and a stop position in the electronic media content corresponding to where the playback of the audio region is to cease. The streaming of the soundtrack is based on control data generated by the remote user device.

22 Claims, 10 Drawing Sheets

(51) Int. Cl.
*G06F 17/30* (2006.01)
*H04L 29/06* (2006.01)
*G11B 27/00* (2006.01)
*G11B 27/11* (2006.01)
*H04N 21/2343* (2011.01)
*H04N 21/442* (2011.01)
*H04N 21/658* (2011.01)
H04N 21/233 (2011.01)
H04N 21/43 (2011.01)
H04N 21/6587 (2011.01)
H04N 21/81 (2011.01)
H04N 21/845 (2011.01)
H04N 21/858 (2011.01)

(52) U.S. Cl.
CPC ............... *G11B 27/11* (2013.01); *H04L 65/60* (2013.01); *H04N 21/2343* (2013.01); *H04N 21/44218* (2013.01); *H04N 21/6582* (2013.01); *H04N 21/2335* (2013.01); *H04N 21/4307* (2013.01); *H04N 21/6587* (2013.01); *H04N 21/81* (2013.01); *H04N 21/8106* (2013.01); *H04N 21/8456* (2013.01); *H04N 21/858* (2013.01)

(58) Field of Classification Search
CPC ........... H04N 21/4307; H04N 21/6587; H04N 21/81; H04N 21/8106; H04N 21/8456; H04N 21/858; G06F 3/165; G06F 17/30746; G06F 17/30749; G06F 17/3074; H04L 65/60
See application file for complete search history.

(56) References Cited

U.S. PATENT DOCUMENTS

| | | |
|---|---|---|
| 2011/0112671 A1 | 5/2011 | Weinstein |
| 2011/0252118 A1* | 10/2011 | Pantos .............. G06F 17/30053 709/219 |
| 2012/0245719 A1 | 9/2012 | Story, Jr. et al. |
| 2013/0131849 A1 | 5/2013 | Mere |

FOREIGN PATENT DOCUMENTS

| | | | |
|---|---|---|---|
| WO | WO-2010/00275 A2 | 1/2010 | |
| WO | WO 2010/002275 A2 * | 1/2010 | ....... G06F 17/30772 |
| WO | WO-2011/060106 A1 | 5/2011 | |
| WO | WO-2013/015694 A1 | 1/2013 | |

OTHER PUBLICATIONS

"European Application No. 14177407.5, Response to European Search Report dated Mar. 22, 2016", (Mar. 22, 2016), 19 pgs.

\* cited by examiner

DELIVERY OF SYNCHRONISED SOUNDTRACKS FOR ELECTRONIC MEDIA CONTENT

CLAIM OF PRIORITY

This application claims the benefit of priority of U.S. Provisional Patent Application Ser. No. 61/847,266, filed on Jul. 17, 2013, the benefit of priority of which is claimed hereby, and which is incorporated by reference herein in its entirety.

FIELD OF THE INVENTION

The invention relates to a system and method for delivery of synchronised soundtracks for electronic media content, such as but not limited to text only or multimedia content comprising text presented in combination with imagery, videos or animations. The playback or delivery of the soundtrack is synchronised with the individual reading speed of the user.

BACKGROUND TO THE INVENTION

To enhance the reading experience, various systems have been proposed in which audio soundtracks relating to the content of text, such as an e-book, are produced and played to the user while they read the text. Some of these systems aim to synchronise the playback of the soundtrack with the user's reading speed.

One such system is described in the applicant's co-pending international PCT patent application publication WO2013/015694, the contents of which is hereby incorporated by reference in its entirety. In this system, a soundtrack for electronic text, such as an e-book, is produced that comprises audio tracks of different types that are configured to play concurrently and/or sequentially while the user is reading the electronic text. Playback of the soundtrack is synchronised with the reading speed of the user. The soundtrack may comprise a combination of different audio types, including ambient noise, sound effects, and background music that are configured to playback at a specific point or over specific portions of the electronic text in a synchronised manner as the user is reading those portions of the electronic text. The soundtrack in WO2013/015694 comprises multiple audio regions that are designated to playback during designated text portions of the electronic text. Each audio region comprises audio data defining the audio track to playback, the start position in the electronic text at which the audio region is to commence playback, and a stop position in the electronic text at which the audio region is to cease playback. In one embodiment described, the electronic text is indexed based on the number of words and the start and stop positions of the audio regions relate to a start and stop word.

WO2013/015694 describes various user playback systems for displaying the electronic text and controlling playback of the associated soundtrack. The user playback system may be implemented on various user hardware devices, including portable consumer electronic devices such as smartphones, tablets and dedicated e-reader devices or personal computers, whether desktop or laptop. The soundtrack data file or files, including all the audio tracks, are entirely downloaded in advance and stored locally on the user device before playback can commence. In some embodiments, the soundtrack and audio track files are combined with the electronic text file as a single multimedia data file for download and playback. The user playback system processes the locally stored downloaded file or files and co-ordinates playback of the audio in accordance with a reading position counter that estimates the user's reading position in the electronic text. This user playback system configuration utilizes heavy processing and memory resources of the hardware device to deliver the synchronised soundtrack. In particular, the soundtrack data file and audio track files may be very large in size and can occupy a significant amount of the local storage on the hardware device, and this limits the user's ability to store a library of soundtracks for their e-books. The downloading of these large files onto devices, especially mobile devices, can also be costly if being downloaded over a user's mobile or other subscribed data connection. Additionally the user playback system uses processing resources to both determine the current reading position and then retrieve and coordinate playback of the audio track file in a synchronised manner.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

It is an object of the invention to provide an improved system for the delivery of synchronised soundtracks for electronic media content, or at least provide the public with a useful choice.

SUMMARY OF THE INVENTION

In a first aspect, the present invention broadly consists in a method of streaming a compiled soundtrack to a remote user device for a reader of electronic media content, the soundtrack defined by multiple audio regions, each audio region defined by: an audio track for playback in the audio region, a start position in the electronic media content corresponding to where the playback of the audio region is to begin, and a stop position in the electronic media content corresponding to where the playback of the audio region is to cease, the method comprising:
  receiving from a remote user device over a network control data indicative of the user's reading speed; and
  streaming a compiled soundtrack to the user device over the network based on the received control data.

In a first form, the compiled soundtrack is a pre-compiled soundtrack and is selected from a range of pre-compiled soundtracks that have been pre-compiled at different reading speeds. Preferably, the method further comprises selecting the pre-compiled soundtrack for streaming having an associated reading speed that most closely matches the control data indicative of the user's reading speed.

In a second form, the compiled soundtrack is a real-time compiled soundtrack and the method further comprises compiling the soundtrack in real-time based on the control data indicative of the user's reading speed. Preferably, the soundtrack is compiled progressively and the method comprises streaming the compiled portion of the soundtrack while the remaining portion is being compiled.

Preferably, the method further comprises receiving control data from the remote user device indicative of the user's desired commencement reading position and commencing streaming of the compiled soundtrack to the user device at a data position within the compiled soundtrack that corresponds to the user's desired commencement reading position. By way of example, the data position may be at the start of the compiled soundtrack or at an offset position within the compiled soundtrack.

Preferably, the method further comprises receiving control data from the remote user device indicative of a change in reading position of the user to a new reading position in the electronic media content, and modifying the streaming of the compiled soundtrack based on the received control data. More preferably, modifying the streaming of the compiled soundtrack comprises adjusting the streaming of the compiled soundtrack to a new data position within the compiled soundtrack that corresponds to the new reading position.

Preferably, the method further comprises receiving control data from the remote user device indicative of a change in reading speed of the user to a new user reading speed, and modifying the streaming of the compiled soundtrack based on the received control data.

In the first form, in which the compiled soundtrack is a pre-compiled soundtrack, modifying the streaming of the compiled soundtrack based on a new user reading speed comprises selecting a new pre-compiled soundtrack having a reading speed that more closely matches the new user reading speed and commencing streaming of the new pre-compiled soundtrack. Preferably, the method further comprises implementing or initiating a transition protocol for transitioning the streaming from the current pre-compiled soundtrack to the new selected pre-compiled soundtrack. In one example, the transition protocol comprises receiving control data from the remote user device indicative of the user's current playback position in the streamed soundtrack and commencing streaming of the new selected pre-compiled soundtrack at a data position corresponding to the user's current playback position. In another example, the transition protocol comprises analyzing the remaining unstreamed portion of the current pre-compiled soundtrack and identifying a transition position based on transition criteria, and commencing streaming of the new selected pre-compiled soundtrack at a data position corresponding to the identified transition position.

In the second form, in which the compiled soundtrack is a real-time compiled soundtrack, modifying the streaming of the compiled soundtrack based on a new user reading position comprises commencing compiling of the soundtrack at the new user reading speed and commencing streaming of the new compiled soundtrack. Preferably, the method further comprises implementing or initiating a transition protocol for transitioning the streaming from the current real-time compiled soundtrack to the new real-time compiled soundtrack. In one example, the transition protocol comprises receiving control data from the remote user device indicative of the user's current playback position in the streamed soundtrack and commencing streaming of the new real-time compiled soundtrack at a data position corresponding to the user's current playback position. In another example, the transition protocol comprises analyzing the remaining unstreamed portion of the current real-time compiled soundtrack and identifying a transition position based on transition criteria, and commencing streaming of the new real-time compiled soundtrack at a data position corresponding to the identified transition position.

In some embodiments, the method comprises streaming the compiled soundtrack as a single digital audio file. In other embodiments, the method comprises streaming the compiled soundtrack as a plurality of digital audio files, for concurrent playback at the remote user device. For example, the audio regions of the soundtrack may be categorised into different types, such as music, ambience, or effects, and the compiled soundtrack may be provided as separate audio files, each audio file comprising the audio regions associated with one type.

In a second aspect, the invention broadly consists in a soundtrack server for streaming a compiled soundtrack to a remote user device for a reader of electronic media content, the soundtrack defined by multiple audio regions, each audio region defined by: an audio track for playback in the audio region, a start position in the electronic media content corresponding to where the playback of the audio region is to begin, and a stop position in the electronic media content corresponding to where the playback of the audio region is to cease, the soundtrack server being configured to:
  receive from a remote user device over a network control data indicative of the user's reading speed; and
  stream a compiled soundtrack to the user device over the network based on the received control data.

The soundtrack server may further comprise any one or more of the features mentioned in respect of the first aspect of the invention.

In a third aspect, the present invention broadly consists in a method of playing a compiled soundtrack on a user device for a reader of electronic media content, the soundtrack defined by multiple audio regions, each audio region defined by: an audio track for playback in the audio region, a start position in the electronic media content corresponding to where the playback of the audio region is to begin, and a stop position in the electronic media content corresponding to where the playback of the audio region is to cease, the method comprising:
  sending control data to a remote server over a network indicative of the user's reading speed;
  receiving an incoming stream of a compiled soundtrack from the remote server over the network, the compiled soundtrack having an associated reading speed that corresponds to the sent control data;
  processing the streamed compiled soundtrack and commencing playback of the soundtrack on the user device.

Preferably, the method further comprises sending control data to the remote server indicative of the user's desired commencement reading position such that the received stream of the compiled soundtrack commences at a data position within the compiled soundtrack corresponding to the user's desired commencement reading position.

Preferably, the method further comprises buffering the incoming stream of the compiled soundtrack into memory on the user device ready for playback. More preferably, the method comprises receiving user input indicative of a new reading position with the electronic media content, determining whether that new reading position corresponds to a playback position that is within the buffered portion of the compiled soundtrack, and either transitioning playback to the new playback position in the buffered compiled soundtrack if it is within the buffer or sending control data indicative of the new reading position to the remote server to initiate an updated stream of the compiled soundtrack at the new reading position if it is outside the buffer. The method may further comprise implementing a transition protocol to transition the playback to the new playback position with the buffer or to the updated incoming stream.

Preferably, the method further comprises receiving user input indicative of a change in reading speed or detecting a change in reading speed, and sending control data indicative of the updated reading speed to the remote server to initiate an updated stream of the compiled soundtrack at the new reading speed. The method may further comprise implementing a transition protocol to transition playback to the updated incoming stream.

In a fourth aspect, the present invention broadly consists in a user device for playing a compiled soundtrack for a reader of electronic media content, the soundtrack defined by multiple audio regions, each audio region defined by: an audio track for playback in the audio region, a start position in the electronic media content corresponding to where the playback of the audio region is to begin, and a stop position in the electronic media content corresponding to where the playback of the audio region is to cease, the user device comprising:

a user interface configured to receive user input to control the device;
an audio output system that is operable to generate audio output for the user to hear; and
a processor configured to:
send control data to a remote server over a network indicative of the user's reading speed;
receive an incoming stream of a compiled soundtrack from the remote server over the network, the compiled soundtrack having an associated reading speed that corresponds to the sent control data; and
process the streamed compiled soundtrack to commence playback of the soundtrack over the audio output system in response to user input.

In one form, the device further comprises a display configured to display the electronic media content, such that both the audible soundtrack and visible electronic media content are provided to the user on the same user device.

In another form, the user device is configured to provide the audible soundtrack to the user and is in data communication with a second separate user device that comprises a display and which is configured to provide the user with the visible electronic media content. By way of example, the data communication between the pair of user devices may be, direct or indirect, including via Radio Frequency (RF), Near-field communication (NFC), Bluetooth, WiFi or other such wireless communication mediums or protocols, or alternatively a wired communication medium may be provided if the pair of user devices are connected via a cable or cables.

The user device(s) may further comprise any one or more of the features mentioned in respect of the third aspect of the invention.

In a fifth aspect, the invention broadly consists in a system for streaming a compiled soundtrack to a remote user device for a reader of electronic media content, the soundtrack defined by multiple audio regions, each audio region defined by: an audio track for playback in the audio region, a start position in the electronic media content corresponding to where the playback of the audio region is to begin, and a stop position in the electronic media content corresponding to where the playback of the audio region is to cease, the system comprising:

a user device comprising:
a user interface configured to receive user input to control the device;
an audio output system that is operable to generate audio output for the user to hear;
a data communication module that is configured to communicate with a remote server via a network; and
a processor configured to:
send control data to the remote server indicative of the user's reading speed;
receive an incoming stream of a compiled soundtrack from the remote server over the network, the compiled soundtrack having an associated reading speed that corresponds to the sent control data; and
process the streamed compiled soundtrack to commence playback of the soundtrack over the audio output system in response to user input; and
a remote server which is configured to:
receive from the user device the control data indicative of the user's reading speed; and
stream a compiled soundtrack to the user device based on the received control data.

In a first embodiment, the user device further comprises a display configured to display the electronic media content. In this embodiment, the user device may be configured to run a first application which controls the retrieval, processing and display of the electronic media content from data files stored locally or on an accessible database or retrieved or streamed from online or the internet or an electronic media content server (such as an electronic e-book server, store or library), and a second application that is configured to receive and process the streamed compiled soundtrack from the remote server and control playback of the compiled soundtrack over the audio output system of the user device. By way of example, the first application may be an Internet browser viewing a webpage, an e-reader software for viewing an e-book, or any other text, document or electronic media content viewer. By way of example, the second application may be a customised soundtrack player or an Internet browser accessing a soundtrack player website hosted by the soundtrack server In a first form, the first and second applications may operate independently without the exchange of data. In a second form, the first application may send data to or make data available for retrieval by the second application, the data being indicative of user reading information including, for example, user's current reading position, reading speed, data indicative of page turns, scrolling information, arbitrary reading position updates, and/or data indicative of the title or details identifying the item of electronic media content being read. The data communication link between the first and second applications may be via an application programming interface (API) or the like.

In this embodiment, the first application running on the user device is configured to display the electronic media content in response to user interaction, and the second application is configured to control the playback of the compiled soundtrack for the electronic media content via user interaction. By way of example, the user device is configured to:

load the electronic media content for display via the first application;
send control data to the remote server to request a streamed compiled soundtrack that corresponds to the electronic media content via the second application;
and receive and playback the stream compiled soundtrack received from the remote server via the second application.

In a second embodiment, the user device further comprises a display configured to display the electronic media content. In this embodiment, the user device is configured to run a single multimedia application which is configured to control the display of the electronic media content and playback of the streamed compiled soundtrack via user interaction.

In a first form, the multimedia application may be an Internet browser that is configured to receive and process the electronic media content and streamed compiled soundtrack received from a remote server in the form of a website server. In one form, the Internet browser may receive the electronic media content and streamed compiled soundtrack in a single combined data stream or alternatively in another form the electronic media content and streamed compiled soundtrack may be sent in separate data streams. In one form, the electronic media content may be downloaded entirely for display or alternatively downloaded and displayed in chunks, or streamed. The soundtrack streaming and/or playback functions may be performed by the Internet browser itself or a plug-in application program to the browser, or an embedded application in the web page.

In a second form, the multimedia application may be a custom application that is configured to retrieve and display electronic media content and control playback of the streamed compiled soundtrack from a multimedia content server. In one form, the multimedia content server may provide electronic media content in the form of an e-book and the streamed compiled soundtrack corresponds to the soundtrack for the e-book. In a first form, the e-book data may be sent in a separate data stream, whether downloaded in advance or in chunks, or streamed (and the audio streams may be sent in a separate data stream). In another form, the e-book data and audio stream may be sent in a combined multimedia data stream.

In a third embodiment, the user device is configured to provide the audible soundtrack to the user and is in data communication with a second separate user device that comprises a display and which is configured to provide the user with the visible electronic media content. By way of example, the data communication between the pair of user devices may be, direct or indirect, including via Radio Frequency (RF), Near-field communication (NFC), Bluetooth, WiFi or other such wireless communication mediums or protocols, or alternatively a wired communication medium may be provided if the pair of user devices are connected via a cable or cables.

In this embodiment, the second separate user device (text display device) is configured to send data to or make data available for retrieval by the first user device (audio playback device), the data being indicative of user reading information including, for example, user's current reading position, reading speed, data indicative of page turns, scrolling information, arbitrary reading position updates, and/or data indicative of the title or details identifying the item of electronic media content being read.

The system may have any one or more of the features mentioned in respect of the first-fourth aspects of the invention.

In a sixth aspect, the present invention broadly consists in a method of streaming an uncompiled soundtrack to a remote user device for a reader of electronic media content, the soundtrack defined by multiple audio regions, each audio region defined by: an audio track for playback in the audio region, a start position in the electronic media content corresponding to where the playback of the audio region is to begin, and a stop position in the electronic media content corresponding to where the playback of the audio region is to cease, the method comprising:
  sending a soundtrack data file to the remote user device over a network, the soundtrack data file comprising data defining the audio regions of the soundtrack;
  receiving control data from the remote user device over the network requesting one or more audio track files corresponding to the audio regions of the soundtrack; and
  sending one or more audio track files to the remote user device over the network in response to the received control data.

In one form, the method comprises receiving arbitrary or periodic control data requesting individual audio track files, and sending the requested audio track files one by one to the remote user device upon request.

In another form, the method comprises receiving control data with a single request for all audio track files associated with the soundtrack, and sending all audio track files to the remote user device, either one by one, in batches or otherwise. Preferably, the method comprises sending the audio track files in order of their playback within the soundtrack.

In another form, the method comprises receiving arbitrary or periodic control data comprising requests for batches of audio track files, and sending the requested batches of audio track files to the remote user device upon request.

In a seventh aspect, the invention broadly consists in a soundtrack server for streaming an uncompiled soundtrack to a remote user device for a reader of electronic media content, the soundtrack defined by multiple audio regions, each audio region defined by: an audio track for playback in the audio region, a start position in the electronic media content corresponding to where the playback of the audio region is to begin, and a stop position in the electronic media content corresponding to where the playback of the audio region is to cease, the soundtrack server being configured to:
  send a soundtrack data file to the remote user device over a network, the soundtrack data file comprising data defining the audio regions of the soundtrack;
  receive control data from the remote user device over the network requesting one or more audio track files corresponding to the audio regions of the soundtrack; and
  send one or more audio track files to the remote user device over the network in response to the received control data.

The soundtrack server may further comprise any one or more of the features mentioned in respect of the sixth aspect of the invention.

In a eighth aspect, the present invention broadly consists in a method of playing an uncompiled soundtrack on a user device for a reader of electronic media content, the soundtrack defined by multiple audio regions, each audio region defined by: an audio track for playback in the audio region, a start position in the electronic media content corresponding to where the playback of the audio region is to begin, and a stop position in the electronic media content corresponding to where the playback of the audio region is to cease, the method comprising:
  sending control data to a remote server over a network requesting a soundtrack for playback;
  receiving a soundtrack data file from the remote serve in response to the sent control data, the soundtrack data file defining the audio regions of the soundtrack;
  processing the soundtrack data file to determine at least the next audio region due for playback based on a user reading position variable indicative of the user's reading position in the electronic media content;
  sending periodic or arbitrary control data to one or more audio track file sources requesting at least the audio track file corresponding to the next audio region due for playback;
  receiving and storing requested audio track files from the one or more audio track file sources in memory; and co-ordinating playback of the stored audio track files as defined by their associated audio regions in the soundtrack data file based on the user reading position variable.

In an embodiment, the soundtrack data file comprises source data indicative of the one or more audio track file sources to request each audio track file from. In some forms, the soundtrack data file may define a single audio track file source from which to request all the audio track files. In other forms, the soundtrack data file may define two or more different audio track file sources from which to request the audio track files.

In a first embodiment, the audio track file source is the remote server, and the method comprises requesting all audio track files from the remote server.

In a second embodiment, the audio track file sources comprise the remote server and one or more other audio track file sources, and the method comprises requesting the audio track files from the remote server or the one or more other audio track file sources based on the source data in the soundtrack data file. For example, some audio track files may be sourced from the remote server, while other audio track files may be sourced from one or more other audio track file sources.

In a third embodiment, the one or more audio track file sources are separate to the remote server, and the method comprises requesting all audio track files from the one or more separate audio track file sources. For example, all audio track files are sourced from somewhere other than the remote server.

In one form, the method comprises sending control data to the one or more audio track file sources requesting individual audio track files one by one.

In another form, the method comprises sending control data to the one or more audio track file sources comprising a single request for all audio track files associated with the audio regions of the soundtrack.

In another form, the method comprises sending control data to the one or more audio track file sources requesting batches of audio track files.

In another form, the method comprises maintaining a sliding download window relative to the user reading position variable (which corresponds to the playback position within the soundtrack), and sending control data to the one or more audio track file sources requesting all audio track files associated with audio regions falling within the sliding download window such that the all audio track files associated with audio regions in the sliding window are received and stored ready for future playback based on the user reading position variable. The size of the sliding download window may be configurable.

In one form, the method further comprises deleting from memory the audio track files after their corresponding audio regions have completed playback either immediately or after a configurable predetermined delay.

In one form, the method further comprises analyzing the soundtrack data file for audio track files that are repeated in more than one audio region of the soundtrack, and tagging those audio track files as repeated audio tracks upon receipt and storage. More preferably, the method comprises retaining each repeated audio tracks in memory until the last audio region associated with the audio track has completed playback.

In a ninth aspect, the present invention broadly consists in a user device for playing an uncompiled soundtrack for a reader of electronic media content, the soundtrack defined by multiple audio regions, each audio region defined by: an audio track for playback in the audio region, a start position in the electronic media content corresponding to where the playback of the audio region is to begin, and a stop position in the electronic media content corresponding to where the playback of the audio region is to cease, the user device comprising:
a user interface configured to receive user input to control the device;
an audio output system that is operable to generate audio output for the user to hear; and
a processor configured to:
send control data to a remote server over a network requesting a soundtrack for playback;
receive a soundtrack data file from the remote serve in response to the sent control data, the soundtrack data file defining the audio regions of the soundtrack;
process the soundtrack data file to determine at least the next audio region due for playback based on a user reading position variable indicative of the user's reading position in the electronic media content;
send periodic or arbitrary control data to one or more audio track file sources requesting at least the audio track file corresponding to the next audio region due for playback;
receive and store requested audio track files from the one or more audio track file sources in memory on the user device; and
co-ordinate playback of the stored audio track files as defined by their associated audio regions in the soundtrack data file based on the user reading position variable.

In one form, the device further comprises a display configured to display the electronic media content, such that both the audible soundtrack and visible electronic media content are provided to the user on the same user device.

In another form, the user device is configured to provide the audible soundtrack to the user and is in data communication with a second separate user device that comprises a display and which is configured to provide the user with the visible electronic media content. By way of example, the data communication between the pair of user devices may be, direct or indirect, including via Radio Frequency (RF), Near-field communication (NFC), Bluetooth, WiFi or other such wireless communication mediums or protocols, or alternatively a wired communication medium may be provided if the pair of user devices are connected via a cable or cables.

The user device(s) may further comprise any one or more of the features mentioned in respect of the eighth aspect of the invention.

In a tenth aspect, the invention broadly consists in a system for streaming an uncompiled soundtrack to a remote user device for a reader of electronic media content, the soundtrack defined by multiple audio regions, each audio region defined by: an audio track for playback in the audio region, a start position in the electronic media content corresponding to where the playback of the audio region is to begin, and a stop position in the electronic media content corresponding to where the playback of the audio region is to cease, the system comprising:
a user device comprising:
a user interface configured to receive user input to control the device;
an audio output system that is operable to generate audio output for the user to hear;

a data communication module that is configured to communicate with a remote server via a network; and a processor configured to:
send control data to a remote server over a network requesting a soundtrack for playback;
receive a soundtrack data file from the remote serve in response to the sent control data, the soundtrack data file defining the audio regions of the soundtrack;
process the soundtrack data file to determine at least the next audio region due for playback based on a user reading position variable indicative of the user's reading position in the electronic media content;
send periodic or arbitrary control data to the remote server requesting at least the audio track file corresponding to the next audio region due for playback;
receive and store requested audio track files from the remote server in memory on the user device; and
co-ordinate playback of the stored audio track files as defined by their associated audio regions in the soundtrack data file based on the user reading position variable; and a remote server which is configured to:
send the soundtrack data file to the user device over a network in response to control data from the user device;
receive control data from the user device over the network requesting one or more audio track files corresponding to the audio regions of the soundtrack; and
send one or more audio track files to the user device over the network in response to the received control data.

In a first embodiment, the user device further comprises a display configured to display the electronic media content. In this embodiment, the user device may be configured to run a first application which controls the retrieval, processing and display of the electronic media content from data files stored locally or on an accessible database or retrieved or streamed from online or the internet or an electronic media content server (such as an electronic e-book server, store or library), and a second application that is configured to receive and process the streamed uncompiled soundtrack from the remote server and control playback of the compiled soundtrack over the audio output system of the user device. By way of example, the first application may be an Internet browser viewing a webpage, an e-reader software for viewing an e-book, or any other text, document or electronic media content viewer. By way of example, the second application may be a customised soundtrack player or an Internet browser accessing a soundtrack player website hosted by the soundtrack server.

In a first form, the first and second applications may operate independently without the exchange of data. In a second form, the first application may send data to or make data available for retrievable by the second application, the data being indicative of user reading information including, for example, user's current reading position, reading speed, data indicative of page turns, scrolling information, arbitrary reading position updates, and/or data indicative of the title or details identifying the item of electronic media content being read. The data communication link between the first and second applications may be via an application programming interface (API) or the like.

In this embodiment, the first application running on the user device is configured to display the electronic media content in response to user interaction, and the second application is configured to control the playback of the uncompiled soundtrack for the electronic media content via user interaction. By way of example, the user device is configured to:
load the electronic media content for display via the first application;
send control data to the remote server to request a streamed uncompiled soundtrack that corresponds to the electronic media content via the second application;
and receive and playback the streamed uncompiled soundtrack received from the remote server via the second application.

In a second embodiment, the user device further comprises a display configured to display the electronic media content. In this embodiment, the user device is configured to run a single multimedia application which is configured to control the display of the electronic media content and playback of the streamed uncompiled soundtrack via user interaction.

In a first form, the multimedia application may be an Internet browser that is configured to receive and process the electronic media content and streamed compiled soundtrack received from a remote server in the form of a website server. In one form, the Internet browser may receive the electronic media content and streamed uncompiled soundtrack in a single combined data stream or alternatively in another form the electronic media content and streamed uncompiled soundtrack may be sent in separate data streams. In one form, the electronic media content may be downloaded entirely for display or alternatively downloaded and displayed in chunks, or streamed. The soundtrack streaming and/or playback functions may be performed by the Internet browser itself or a plug-in application program to the browser, or an embedded application in the web page.

In a second form, the multimedia application may be a custom application that is configured to retrieve and display electronic media content and control playback of the streamed compiled soundtrack from a multimedia content server. In one form, the multimedia content server may provide electronic media content in the form of an e-book and the streamed uncompiled soundtrack corresponds to the soundtrack for the e-book. In a first form, the e-book data may be sent in a separate data stream, whether downloaded in advance or in chunks, or streamed (and the audio streams may be sent in a separate data stream). In another form, the e-book data and audio stream may be sent in a combined multimedia data stream.

In a third embodiment, the user device is configured to provide the audible soundtrack to the user and is in data communication with a second separate user device that comprises a display and which is configured to provide the user with the visible electronic media content. By way of example, the data communication between the pair of user devices may be, direct or indirect, including via Radio Frequency (RF), Near-field communication (NFC), Bluetooth, WiFi or other such wireless communication mediums or protocols, or alternatively a wired communication medium may be provided if the pair of user devices are connected via a cable or cables.

In this embodiment, the second separate user device (text display device) is configured to send data to or make data available for retrieval by the first user device (audio playback device), the data being indicative of user reading information including, for example, user's current reading position, reading speed, data indicative of page turns, scrolling information, arbitrary reading position updates, and/or data indicative of the title or details identifying the item of electronic media content being read.

The system may have any one or more of the features mentioned in respect of the fifth-ninth aspects of the invention.

In another aspect, the invention broadly consists in a computer-readable medium having stored thereon computer readable instructions that, when executed on a processing device, cause the processing device to perform any one or more of the methods defined in the previous aspects of the invention.

Definitions

The term "soundtrack" as used in this specification and claims is intended to mean, unless the context suggests otherwise, a soundtrack for playback while reading electronic media content and of the type described in WO2013/015694 which comprises multiple audio regions that are configured for playback at predetermined reading positions or regions within the electronic media content, and where the playback timing of the soundtrack is synchronized with the user based on their estimated reading position and/or reading speed.

The phrases "streaming", "stream", or "streamed" as used in this specification and claims is intended to mean, unless the context suggests otherwise, the streaming of the soundtrack to a user device from a remote server in any form which enables the user to commence playback of the soundtrack without downloading the entire soundtrack, whether the soundtrack is in the form of a compiled soundtrack ready-to-play or an uncompiled soundtrack, and includes any suitable form of streaming the data such as continuous streaming of the soundtrack, sending the soundtrack in batches, chunks, portions or sections, and whether the streaming is controlled by the server, user device, or a combination of these.

The phrase "compiled soundtrack" as used in this specification and claims is intended to mean, unless the context suggests otherwise, a soundtrack compiled in the form of a ready-to-play digital audio file, the soundtrack being compiled at a configurable reading speed to modify the duration of the soundtrack to suit readers having different reading speeds, the compiled soundtrack may be compiled, encoded and/or compressed into any digital audio format for playback by a digital audio player or audio player software, and including real-time compiled audio files or pre-compiled audio files.

The phrase "uncompiled soundtrack" as used in this specification and claims, is intended to mean, unless the context suggests otherwise, a soundtrack in the form of a package of files comprising a soundtrack data file defining the playback data for the multiple audio regions of the soundtrack and the audio track files associated with each audio region, the uncompiled soundtrack being configured for playback by a soundtrack player that processes the soundtrack data file and co-ordinates synchronized playback of the audio track files of the audio regions with the user's reading based on data, a counter, or a variable indicative of the user's reading position within the electronic media content.

The phrase "user device" as used in this specification and claims is intended to mean, unless the context suggests otherwise, any form of programmable electronic hardware device, platform or system including, but not limited to, portable or non-portable consumer electronic devices such as smartphones, cellphones, tablets, e-Reader or e-book devices, laptops, and notebooks, gaming machines or consoles, smart televisions, desktop computers or the like.

The term "network" as used in this specification and claims is intended to mean, unless the context suggests otherwise, any data network or data communication channel or combination of networks or channels over which a user device may send and/or receive data to another device, whether a remote server or servers or other user devices, including, but not limited to, the internet, an intranet or extranet, a Local Area Network (LAN), and/or a Wireless Local Area Network (WLAN), whether accessed over a wired or wireless medium or a combination of these.

The term "server" as used in this specification and claims is intended to mean, unless the context suggests otherwise, any form of electronic server that is capable or configured to serve or stream soundtracks to a user device over a network, whether a website server, dedicated soundtrack server, electronic media content server, or any other form of server, whether a dedicated server or other hardware system or platform performing a server function, and the server may be configured to service or host one or more client or user devices, and including any form of data communication between the user device and server, whether wired, wireless or a combination of these.

The phrase "electronic media content" as used in this specification and claims is intended to mean, unless the context suggests otherwise, any electronic media content comprising electronic text, whether alone or in combination with static or animated imagery or graphics, the electronic media content being in any format or file-type capable of being rendered on an electronic display, and including, but not limited to, an electronic book or e-book, a webpage, digital video, or slide show presentation.

The term "comprising" as used in this specification and claims means "consisting at least in part of". When interpreting each statement in this specification and claims that includes the term "comprising", features other than that or those prefaced by the term may also be present. Related terms such as "comprise" and "comprises" are to be interpreted in the same manner.

As used herein the term "and/or" means "and" or "or", or both.

As used herein "(s)" following a noun means the plural and/or singular forms of the noun.

The invention consists in the foregoing and also envisages constructions of which the following gives examples only.

In the following description, specific details are given to provide a thorough understanding of the embodiments. However, it will be understood by one of ordinary skill in the art that the embodiments may be practiced without these specific details. For example, software modules, functions, circuits, etc., may be shown in block diagrams in order not to obscure the embodiments in unnecessary detail. In other instances, well-known modules, structures and techniques may not be shown in detail in order not to obscure the embodiments.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc., in a computer program. When a process corresponds to a function, its termination corresponds to a return of the function to the calling function or a main function.

BRIEF DESCRIPTION OF THE DRAWINGS

Embodiments of the invention will be described by way of example only and with reference to the drawings, in which.

DETAILED DESCRIPTION OF PREFERRED EMBODIMENTS

1. Overview of Synchronised Soundtracks

Figure 1:
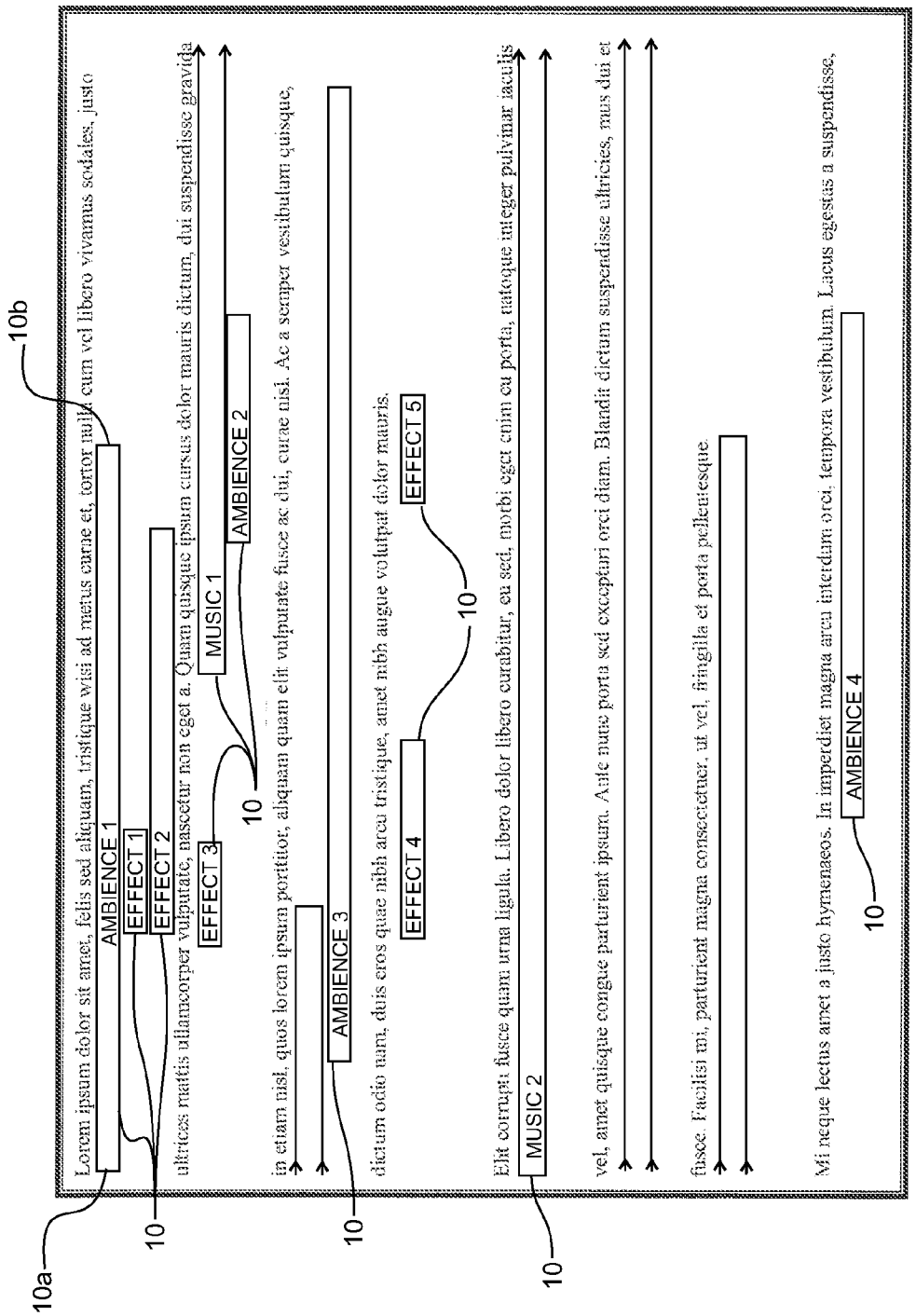
FIG. 1 is a schematic data illustration of a portion of text and the associated audio regions of a soundtrack configured for playback during the reading of the electronic text.

This invention relates to delivery of soundtrack of the type described in WO2013/015694, as referred to above. The soundtracks are created to enhance the user's reading experience for an item of electronic text.

The soundtracks may be applied to electronic text in any format or file-type, including but not limited to those associated with the following file extensions: aeh, djvu, epub, fb2, html, xhtml, azw, lit, prc, mobi, exe, pdb, txt, pdb, pdf, ps, rgo, pdb, tr2, tr3, wol, rtf, doc, docx, asc, lit, wri, odt, text, pwi, rtx, sdw, strings, utf8, utf16, wp*, wpw, wri, wtx, asc, csv, lwp, dtp, indd, pmd, ppp, pub, fm, and any type of mark up language types, including but not limited to SGML, HTML, XHTML, HTML5, XML, and LaTex. The electronic text may be in the form of any electronic media content whether comprising text only or text in combination with imagery or graphics, whether static or moving (e.g. video or other animations). By way of example, but not limited to, the electronic media content may be in the form of an e-book, a webpage, comic or any other electronic media content format.

The soundtrack is customised to the electronic media content and in particular customized to the content of the electronic text to enhance the reading experience for a reader of the electronic text. The soundtrack may comprise audio tracks of different types and may be configured to play concurrently, sequentially, or both while the user is reading the electronic text. Playback of the soundtrack is synchronized with the reading speed (e.g. words per minute or scrolling speed or some other metric) of the user. In one example, the electronic text may be a fiction or non-fiction book, and the soundtrack may comprise a combination of different audio types, including ambient noise, sound effects, and background music that may be configured to play back at a specific point or over specific portions of the electronic text in a synchronized manner as the user is reading those portions of the electronic text.

The soundtrack comprises multiple audio regions that are designated to playback during designated text portions of the electronic text. Each audio region comprises audio data defining the audio track to playback and audio properties defining the desired nature of the playback. The audio data specifies a start text position in the electronic text at which the audio region is to commence playback and a stop text position at which the audio region is to cease playback. In one embodiment, the electronic text is designated a numerical text index based on the number or words or characters in the electronic text, and the start and stop text positions are defined by corresponding start and stop index values respectively. In one example, the indexing of the text is based on the number of words in the electronic text such that each word has a unique index value representing its position in the electronic text. The index values for each word may correspond to their word number or word count in the electronic text. In this example, the audio regions playback between start and stop index values representing the selected start and stop words in the electronic text for that audio region.

When the user is reading the electronic text, a reading position counter or identifier is maintained which corresponds to text position in the electronic text at which the user is estimated as currently reading. The reading position counter increments or changes at a rate at least partially based on the user's reading speed. This reading position counter allows the playback of the audio regions of the soundtrack to be synchronized with the user's reading speed such that playback of an audio region is triggered when the reading position counter matches the start index value of the start word for the audio region, and likewise ceases when the reading position counter matches the stop index value of the stop word of the audio region.

In alternative embodiments, other reading position referencing scheme may be employed in contrast to word or character based indexing. In other embodiments, the start and stop positions of each audio region may be defined by any other document or text position referencing scheme or system. One such example is the ePub canonical fragment identifier (CFI). In such an example, the start and stop positions in the audio region will be defined by the CFI parameter or ranges, and a reading position variable would be maintained in the CFI format which changes or increment based on the user's reading speed to trigger the playback of the audio regions of the soundtrack when their CFI value match the reading position variable.

The soundtrack comprises multiple audio regions and playback of two or more regions may partially or entirely overlap such that two or more audio regions can playback concurrently if desired. The soundtrack is provided with multiple channels for playback and overlapping audio regions are designated different channels in the set of available channels to allow for concurrent playback. This enables different audio tracks, such as sound effects, ambient noise, or background music to be concurrently played and mixed together to provide an overall soundtrack that enhances the user's reading experience for that particular electronic text. Typically, the audio data for each audio region includes an audio type, such as "music", "ambience", or "effect". The selected audio type is intended to define the nature of the audio region. For example, if an audio region is for background music, then the audio type selected will be "music". If the audio region is a sound effect, then the "effect" audio type is selected. If the audio region is intended to be an ambient sound or noise, then the "ambience" audio type is selected.

By way of example, FIG. 1 shows a portion of electronic media content comprising electronic text only. FIG. 1 also overlays the text with a schematic representation of a number of audio regions 10 configured for playback during reading of the electronic text in the schematic representation, the audio regions 10 are each represented by a bar or underline that extends below the portion of text to which it relates. The start 10*a* of each bar or underline of the audio region represents the start position at which the audio track of that audio region will commence playback and the end 10*b* represents the position in the electronic text at which the audio track of the audio region will cease playback. Each audio region may extend over a single word or group of words, a line, multiple lines or even pages. As shown the audio regions may overlap such that they playback concurrently.

Figure 2:
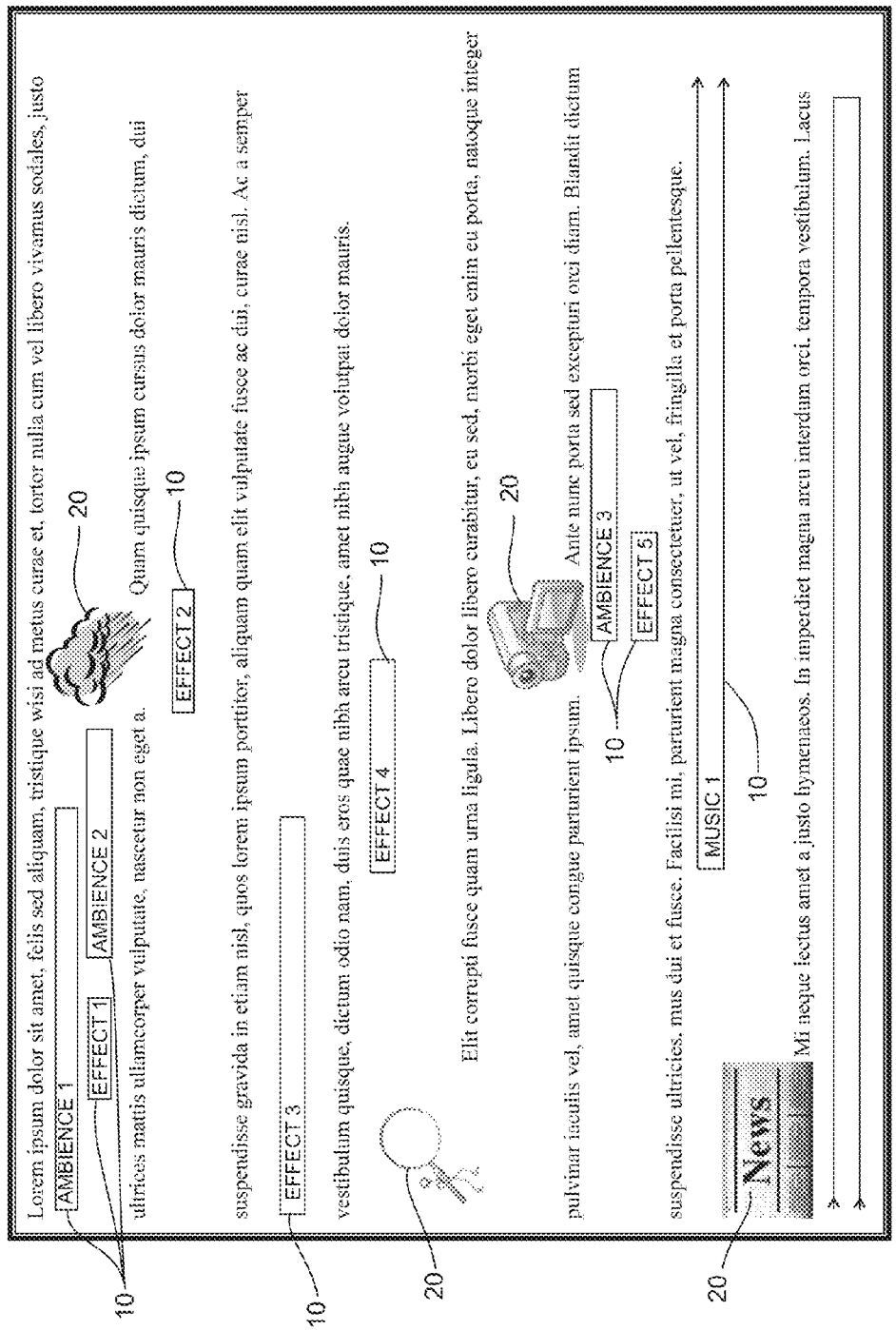
FIG. 2 is a schematic data illustration similar to FIG. 1 except showing a soundtrack of the invention configured for electronic media content comprising text and images.

Referring to FIG. 2, the electronic media content may comprise multimedia content comprising text and imagery, whether static or moving. FIG. 2 shows such an electronic text containing static images 20. For such electronic media content, the soundtrack audio region may have start and stop positions which either correspond to text or imagery. For example an audio region may be configured to start on a particular word, and then end when a user is expected to be looking at a particular image embedded within the text. Alternatively, an audio region may be configured to commence playback when a user is expected to be viewing a particular embedded image. It will be appreciated that for image-based multi-media content such as comics, the reading position identifier may identify the image the user is expected to be viewing, and the reading speed may be in the form of scroll or scan speed for the images, for example images per second or minute, for example.

2. Streaming of Soundtrack to User Device from a Remote Server

General Overview

The invention primarily relates to the streamed delivery of a synchronised soundtrack to a user device from a remote server over a network. The soundtrack may be streamed in two main alternative forms, namely as a compiled soundtrack or an uncompiled soundtrack. In one embodiment, a single user device is provided for both displaying the visible electronic media content and receiving the streamed soundtrack for audible playback. In another embodiment, a pair of separate user devices is provided which are in data communication. One of the user devices provides the visible electronic media content, while the other user device receives the streamed soundtrack for audible playback. The data communication between the devices enables the soundtrack playback to be synchronised with the display of the electronic media content.

In the first form, when streaming as a compiled soundtrack, the server streams a compiled digital audio file of the soundtrack that is ready for playback by any suitable generic or customised digital audio player software, whether a stand-alone application or a plug-in or function of another application. A single digital audio file of the soundtrack may be streamed or alternatively two or more audio files (each containing audio regions of the soundtrack of a particular type, eg 'music' or 'effect' or 'ambience', or some other breakdown) representing the soundtrack may be streamed ready for playback concurrently together to recreate the entire soundtrack. Alternatively, the user may deactivate one or more of the audio files from playback to effectively mute one or more types of audio regions from playback. The audio file or audio files of the soundtrack delivered by the server are compiled at a configured reading speed that may be selected by the user to suit their individual reading speed such that the playback timing of the audio regions corresponds to their expected reading position within the electronic media content.

In the second form, when streaming as an uncompiled soundtrack, the server streams the soundtrack data file and audio track files relating to the audio regions of the soundtrack to the user device. The user device comprises a customised soundtrack playback module or function that is configured to process the soundtrack data file and co-ordinate synchronised playback of the audio track files of the audio regions with the user's estimated or expected reading position in the electronic media content. The soundtrack playback module or function may be a stand-alone application or integrated with another application as a plug-in or the like. The soundtrack playback module is configured to maintain a user reading position variable indicative of the user's expected reading position within the electronic media content and trigger playback of the audio regions defined in the soundtrack data file based on this user reading position variable, and may operate in a similar manner to the soundtrack playback module described in WO2013/015694. By way of example, if the audio regions of the soundtrack are defined by start and stop positions relating to a word index or count as described above, the user reading position variable may be a counter corresponding to the estimated word in the electronic text that the user is reading. The counter may then increment at a rate at least partly based on a configurable reading speed variable representing the user's reading speed. The counter may also be arbitrarily or periodically updated to the user's actual reading position by various user interaction or user input, including page turns, scrolling, arbitrary reading position update inputs such as the user clicking a mouse cursor on the current word they are reading or tapping (in the case of a touch screen display) on the current word they are reading, or other such means for updating the user reading position variable.

In both streaming cases above, for the compiled and uncompiled soundtracks, the soundtrack may be streamed at a data transfer rate that is equal to the data playback rate on the user device or more preferably at a higher data transfer rate to account for data transfer delay or interruptions caused by, for example, network latency, server or user device performance, or the like. When streaming at a higher data transfer rate than the data playback rate, the user device is provided with a buffer for temporarily storing the incoming data ready for future playback. The size of the buffer may be fixed or may dynamically change during streaming. The buffer size may be configurable and controlled by either the user device or the server. If desired, the buffer size may be set to zero to effectively limit the data transfer rate to the data playback rate. Optionally, the system may be configured to vary the bit rate or quality of the soundtrack delivered to the user device based on the bandwidth of the data channel between the server and user device.

Figure 3A:
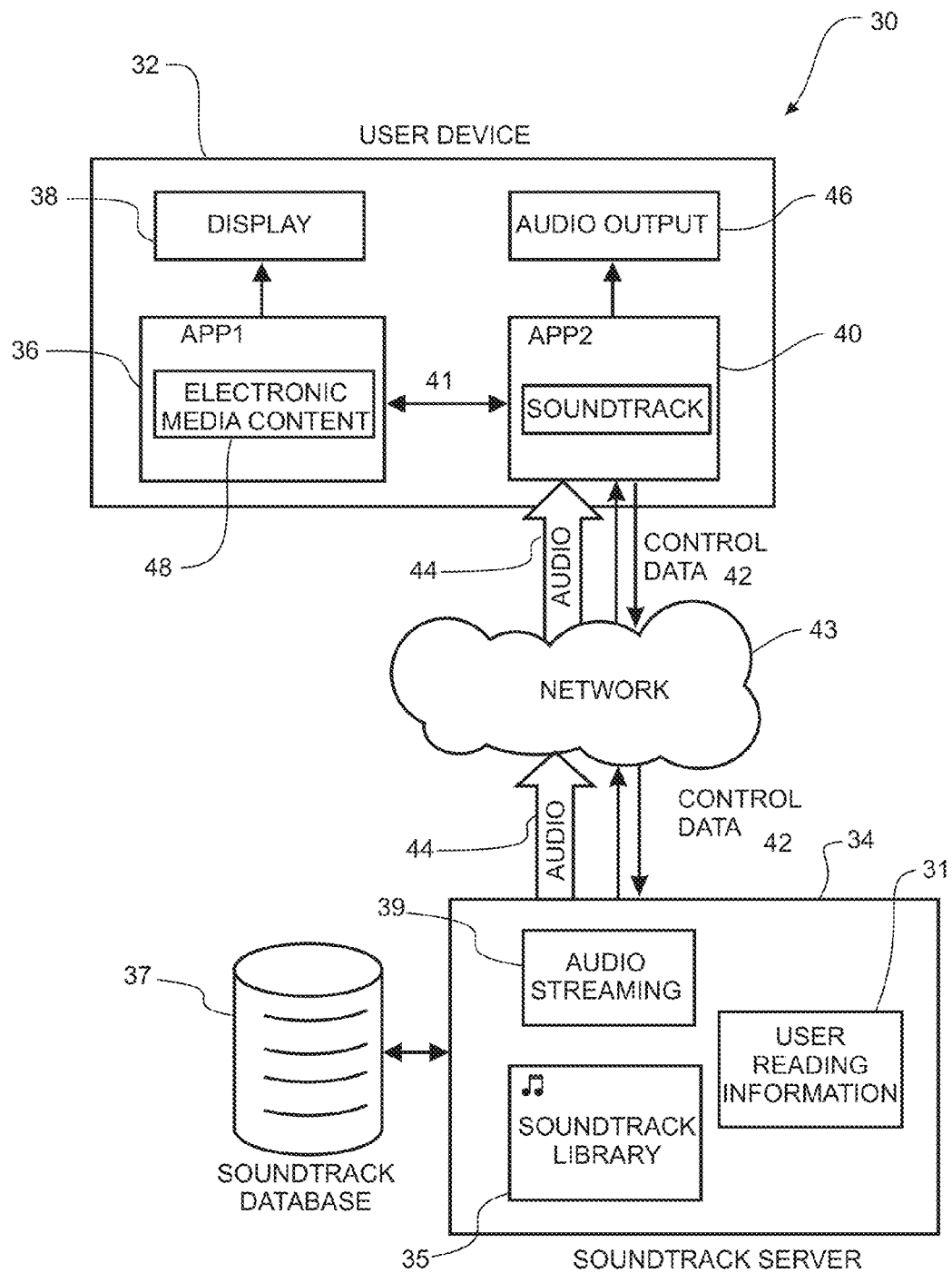
FIG. 3A is a schematic illustration of a soundtrack delivery system in accordance with a first embodiment of the invention in which separate applications on the user device control display of the electronic media content and playback of the soundtrack based on an audio stream from a remote server.
Figure 3B:
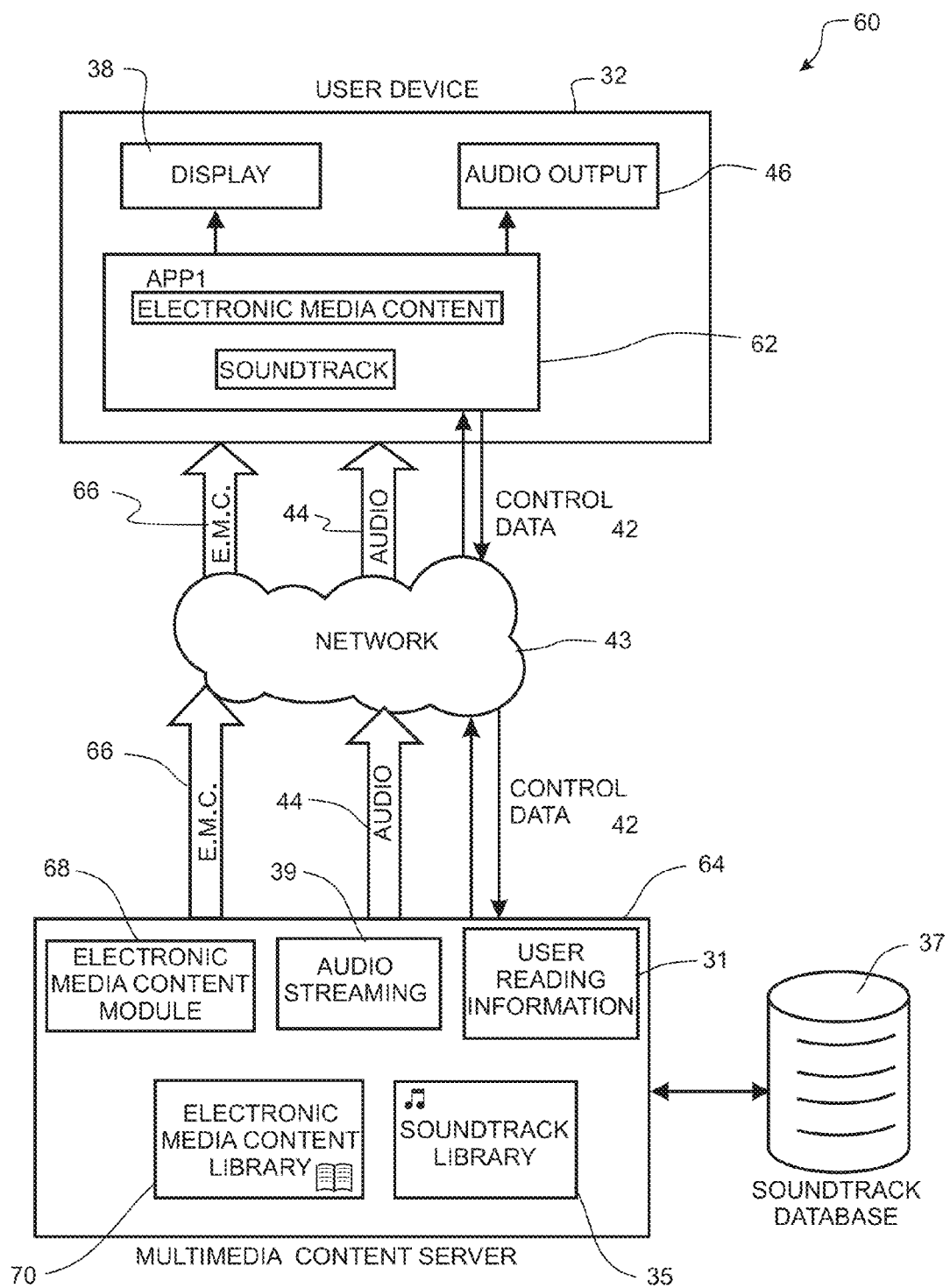
FIG. 3B shows a schematic illustration of a soundtrack delivery system in accordance with a second embodiment of the invention, the system employing a single multimedia application to control the display of the electronic media content and playback of the soundtrack based on electronic media content and audio data stream from a remote multimedia content server.
Figure 4:
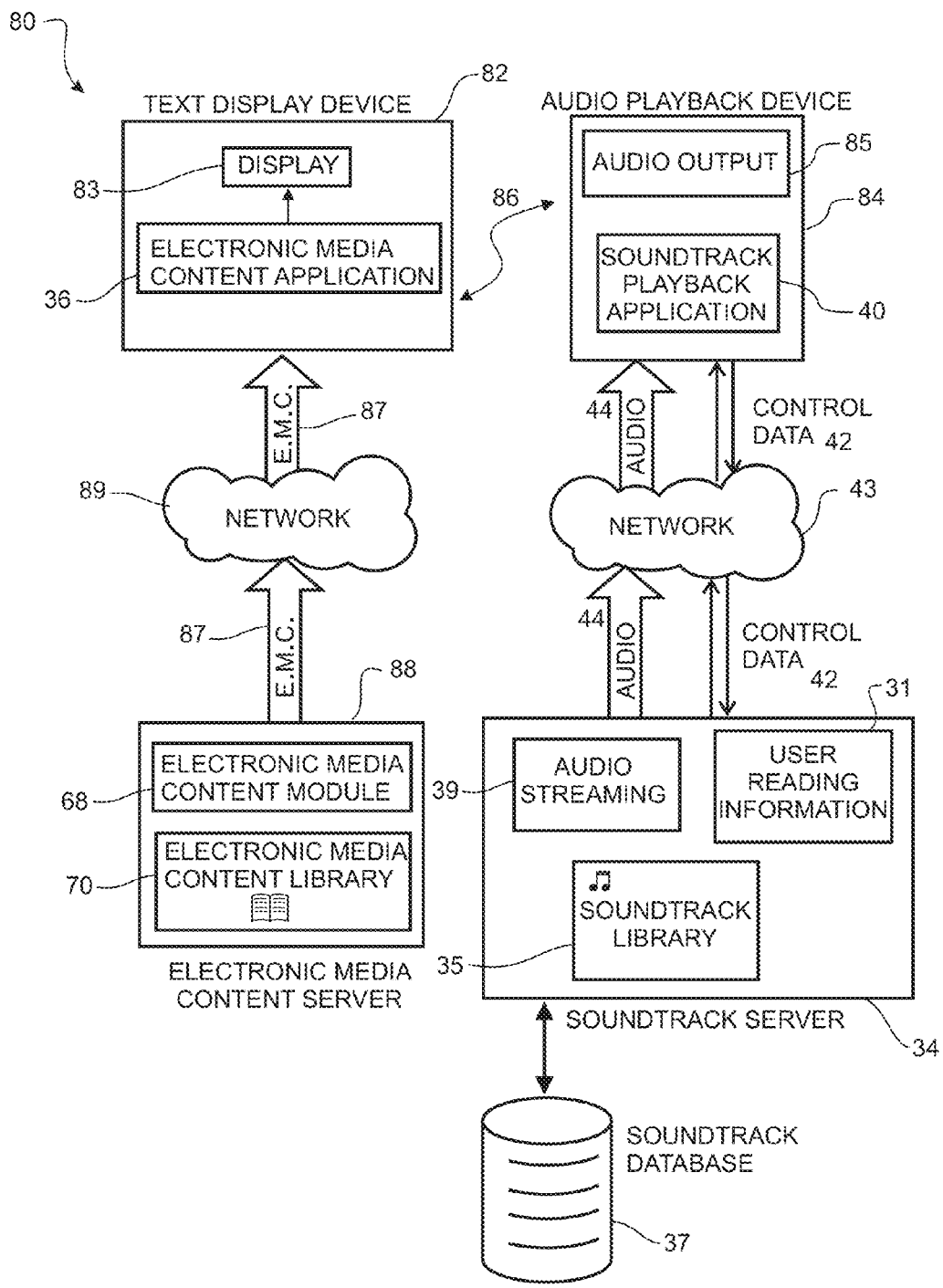
FIG. 4 shows a schematic illustration of a soundtrack delivery system in accordance with a third embodiment of the invention, the system employing a pair of user devices in data communication, one user device controlling the display of the electronic media content and the other user device controlling playback of the soundtrack based on an audio data stream from a remote server.

The soundtrack may be streamed separately to or in combination with the corresponding electronic media content, and the display and playback of the electronic media content and soundtrack may be controlled in separate application programs or a combined application program in embodiments employing a single user device, or in separate application programs running on separate devices in embodiment employing a pair of user devices in data communication. In some forms, the user may already have the electronic media content stored on a user device and only require the corresponding soundtrack from the server for playback on that or a separate user device during reading of the electronic media content. Referring to FIGS. 3A, 3B, and 4, some examples of these different system configurations will be described.

Example 1—Separate Applications on User Device for Text and Soundtrack

FIG. 3A shows a first example 30 of a system configuration in which the user device 32 runs separate applications for controlling the display of the electronic media content and playback of the synchronised soundtrack received from the soundtrack server 34. In the system configuration 30, the user device 32 may comprise a first application 36 (an electronic media content or text application) which is responsible for the retrieval, processing and display of electronic media content 48 from data files stored locally or an accessible database or retrieved or streamed from online or the internet or an electronic media content server (such as an electronic e-book server, store or library) on a display 38 of the user device. The text application 36 may be any form of electronic media content viewer or editor. In one example, the text application may be an e-reader software for displaying electronic media content in the form of an e-book file. Alternatively, in another example the text application may be an Internet browser viewing electronic media content in the form of a webpage.

The second application 40 (soundtrack application) is operable to receive, process and playback an audio data stream or streams representing synchronised soundtrack for the electronic media content received from a remote soundtrack server 34 over the network 42. The soundtrack application may be any software or application program that is capable of interacting with the soundtrack server 34 via control data 42 and which is capable of receiving one or more audio streams 44 from the soundtrack server 34, and which is further capable of processing the incoming audio data and playing the soundtrack over the audio output system 46 of the user device 32. It will be appreciated that the audio output 46 may be any form of audio transducer, including integrated or external speakers, headphones, earphones or the like.

In a first form, text application 36 and soundtrack application 40 may operate independently without the exchange of data. In a second form, the applications 36,40 may send or make data available to each other via data communication channel or link 41, such an API or similar. For example, the text application 36 may send data to or make data available for retrieval by the soundtrack application 40, the data being indicative of user reading information including, for example, user's current reading position, reading speed, data indicative of page turns, scrolling information, arbitrary reading position updates, and/or data indicative of the title or details identifying the item of electronic media content being read.

In one example, the soundtrack application 40 may be customised soundtrack player application which is configured for the sole purpose of accessing a synchronised soundtrack for an associated electronic media content from the remote soundtrack server 34. Alternatively, the soundtrack application may be an add-on or plug-in to another main user software application. In one such example, the soundtrack application may be integrated with an Internet browser, and the soundtrack application may be a plug-in application to the Internet browser. In another example, the soundtrack application may be an Internet browser that is able to access a soundtrack player webpage or soundtrack library hosted by the soundtrack server 34.

The typical operation of the first example system configuration 30 will now be described. Firstly, the user loads electronic media content for display via the text application 36. The user then launches their soundtrack application 40 and selects, or the application automatically selects based on the loaded electronic media content, the synchronised soundtrack corresponding to the electronic media content from the soundtrack server 34. For example, the user may operate the soundtrack application 40 to access a soundtrack library 35 of the soundtrack server which displays the available soundtracks for different electronic media content. The soundtrack library 35 represents all the soundtracks stored in a soundtrack database 37 that is integrated with or accessible by the soundtrack server. For example if the user is displaying an e-book in the text application 36, then they may search the soundtrack server via the soundtrack application 40 for the one or more associated soundtracks that have been customised or configured for that particular e-book. The user interacts with the soundtrack server via control data 42 sent by their soundtrack application 40 in response to user input/interaction. Once the soundtrack has been selected, the server 34, via audio streaming module 39, may stream the soundtrack via one or more audio data streams 44 to the user device 32 for playback by the soundtrack application 40.

Compiled Soundtrack Streaming

If the server is configured to stream a compiled soundtrack, a user reading speed setting is configured for the user and this may be stored in a user reading information module 31. For example, the user reading speed setting may be configured in various ways via the soundtrack application 40 and sent to the server via the control data 42, including the user inputting a numerical reading speed, selecting a reading speed from a list, or a scale, conducting a reading speed test provided by the soundtrack server via the soundtrack application 40, or the user's reading speed may be extracted from historical data stored in the soundtrack application 40 or in the soundtrack server 34, for example. Once the user reading speed setting is configured, the server is configured to stream a compiled soundtrack that corresponds to the user reading speed setting. As will be explained in further detail later, the compiled soundtrack may be compiled or progressively compiled in real-time to a specific reading speed prior to streaming or alternatively a library of pre-compiled soundtracks at a range of different reading speeds may be available in the server and the one most closely matching the user's reading speed setting may be selected (automatically by the server or manually by the user) to be streamed to the user device. The soundtrack application 40 stores or buffers the incoming audio data stream into memory, and the user may initiate playback of the ready-to-play audio file of the soundtrack via the soundtrack application as they commence reading, or playback can be automatically initiated by the soundtrack application 40 based on data from the text application 40 indicative of the user's interaction with the electronic media content.

Uncompiled Soundtrack

If the server is configured to stream an uncompiled soundtrack, the soundtrack data file and audio track files defining the audio regions are streamed to the user device 32 over one or more audio data streams 44 by the server 34 in response to control data 42 from the soundtrack application 40 on the user device. The soundtrack application 40 stores or buffers the incoming audio data stream into memory. As will be explained in further detail later, the soundtrack data file may be sent entirely or in predefined chunks or sections. Likewise, the audio track files may be sent one by one in order of playback or in batches corresponding to predefined chunks or sections of the soundtrack. The user configures their reading speed setting (either manually or it is automatically detected) in the soundtrack application 40 on the user device using any of the previously discussed techniques. The user may initiate playback of the soundtrack as they commence reading or this can occur automatically as above, which causes the soundtrack application to process the soundtrack data file and trigger the co-ordinated playback of the audio track files corresponding to the audio regions based on a user reading position variable indicative of the user's estimated or expected reading position in the electronic media content as previously explained.

Example 2—Single Application on User Device for Text and Soundtrack

FIG. 3B shows a second example of another system configuration 60 in which the user device 32 runs a single application (multimedia application) to control the display of the electronic media content and playback of the synchronised soundtrack, but is otherwise similar to the first system configuration 30. Like reference numerals represent like components and functionality in the drawings. In this example, a single multimedia application 62 is configured to run on the user device 32 and controls the display of the electronic media content and the playback of the soundtrack, functionality that was carried out by the text and soundtrack applications 36, 40 in the first system configuration 30.

In this system configuration 60 the multimedia application 62 may be configured to interact with a multimedia content sever 64 to with control data 42 to receive the audio stream 44 representing the soundtrack synchronised to the electronic media content viewed on the user device in a process similar to that described with respect to the first system configuration 30.

The multimedia application 60 may source the electronic media content from locally stored data files or data files stored in an accessible database or retrieved or streamed from online or the internet or an electronic media content server (such as an electronic e-book server, store or library). In one example, the multimedia data application may fully download, progressively download, or stream the electronic media content from the multimedia content server 64 over a electronic media content data channel 66. In such examples, the multimedia content server 64 may comprise an electronic media content module 68 that is configured to control the delivery of the electronic media content to the user device over the network 43.

In one example, the multimedia application 62 may be a custom software application program that is configured for interaction with the multimedia content server and which enables the user to select multimedia content comprising electronic media content and an associated synchronised soundtrack for display and playback respectively from the multimedia content server. By way of example, the multimedia content server may provide a library 70 of e-books and corresponding synchronised soundtracks customised for the e-books. The e-book data may be sent in the electronic media content data stream 66 and the soundtrack may be streamed in the audio data stream 44 to the user device. Alternatively, the electronic media content and audio data streams need not be separate and may be combined into a single multimedia data stream.

In another example, the multimedia application 62 may be in the form of an Internet browser. In such examples, the multimedia content server may be a website server that in the electronic media content may be a webpage downloaded to the Internet browser over electronic media content data stream 66. In parallel, the Internet browser may have a soundtrack player functionality as an plug-in application or alternatively a soundtrack player functionality may be an embedded application within webpage content which is configured to control the audio stream streaming 44 for the and soundtrack playback.

The soundtrack application functionality of the multimedia application 62 operates similarly to the first system configuration 30 as above, in the context of streaming either compiled or uncompiled soundtracks. As the multimedia application 60 has inherent knowledge about the user's interaction with the electronic media content, it can determine updated user reading positions, periodically or arbitrarily, based on user interaction/input (e.g. page turns, scrolling, arbitrary reading position update inputs etc) to assist in co-ordinating synchronised playback of the compiled or uncompiled soundtrack as will be explained in further detail later.

Example 3—Pair of User Devices in Data Communication

FIG. 4 shows a third example of another system configuration 80 in which a pair of user devices 82,84 is provided. The first user device 84 (audio playback device) has an audio output 85 and is configured to provide the audible soundtrack to the user, and the second user device 82 (text display device) has a display 83 and is configured to provide the user with the visible electronic media content. This third system configuration 80 is similar to the first system configuration 30 of FIG. 3A, except the text application 36 and soundtrack application 40 have been separated to operate on separate user devices. Like reference numerals represent like components and functionality in the drawings, and won't be repeated.

By way of example, the data communication link 86 between the pair of user devices 82,84 may be, direct or indirect, including via Radio Frequency (RF), Near-field communication (NFC), Bluetooth, infrared, WiFi or other such wireless communication mediums or protocols, or alternatively a wired communication medium may be provided if the pair of user devices are connected via a cable or cables. The data connection 86 between the user devices 82,84 serves a similar purpose to the data communication channel 41 described in the system configuration 30 of FIG. 3A. In particular, the text display device 82 may be configured to send data to or make data available for retrieval by the audio playback device 84 over the data link 86, the data being indicative of user reading information including, for example, user's current reading position, reading speed, data indicative of page turns, scrolling information, arbitrary reading position updates, and/or data indicative of the title or details identifying the item of electronic media content being read.

The electronic media content data for display on the text display device 82 may be stored locally on the device or an accessible database or, as shown, the data 87 may be downloaded, streamed or otherwise retrieved from an electronic media content server 88 over a network 89. The electronic media content server 88 may be in the form of an e-book server, store or library, a website server, or any other form of electronic media content server such as, for example, one having an electronic media content module 68 and electronic media content library 70 as described with reference to the system configuration 60 in FIG. 3B, where like numerals represent like components.

As an example of the system configuration 80, the text display device 82 might be in the form of an e-Reader device, tablet or smartphone running an e-Reader application or other text application, desktop computer or any other electronic device capable of running a text application 36 and displaying the electronic media content on the display 83. Likewise, the audio playback device 84 may be in the form of a tablet, smartphone, computer, dedicated audio playback device, or any other electronic device capable of running the soundtrack playback application 40 to generate the audible playback of the audio output 85. The user may operate any pair of such devices which are in data communication, to view the electronic media content on one device 82, while hearing the synchronised soundtrack via the other device 84.

Server Configurations for Electronic Media Content

As described above in the various system configurations 30, 60, 80 above, the electronic media content data, in some embodiments, may be streamed, downloaded or otherwise retrieved from the same server as the soundtrack, or alternatively a separate server, e.g. a $3^{rd}$ party server. In particular, in some forms a multimedia server is provided which provides both the soundtrack and electronic media content, and in other forms a soundtrack server is provided and an electronic media content server is provided. In the case of separate servers, each server may be owned and operated by the same entity or separate entities.

Various embodiments or implementations of the soundtrack delivery system will now be described with reference to FIGS. 5A-7. In particular, example embodiments for streaming compiled soundtracks will be described with reference to FIGS. 5A-6 and example embodiments for streaming uncompiled soundtracks will be described with reference to FIG. 7. These implementations can apply to any one of the system configurations of FIGS. 3A-4. Where a single user device system configuration like FIGS. 3A and/or 3B is described, it will be appreciated that this may be adapted or modified to operate on a pair of user devices as described for the system configuration of FIG. 4.

3. Streaming of Pre-compiled Soundtracks

Overview

Figure 5A:
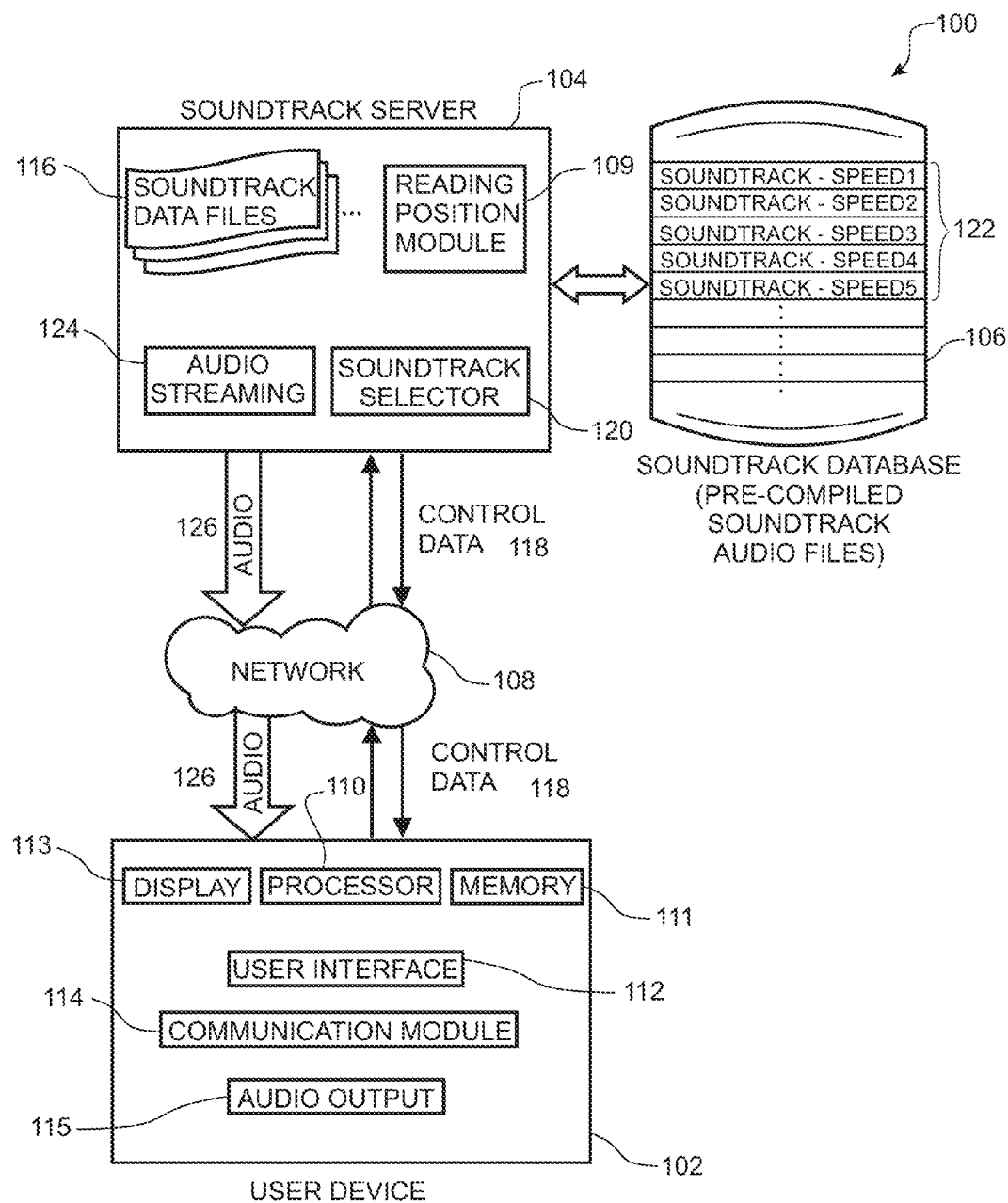
FIG. 5A is a schematic illustration of a soundtrack delivery system in accordance with a first form of the invention, the system delivering a selected pre-compiled soundtrack audio file over an audio stream from a soundtrack server to a remote user device, the soundtrack being selected from a library of soundtracks pre-compiled at a range of different reading speeds.

Referring to FIG. 5A, a first form of the soundtrack delivery system 100 is configured to stream a pre-compiled soundtrack to the user device 102 from the soundtrack server 104. The soundtrack server has an integrated or an accessible soundtrack database 106 comprising a range of pre-compiled soundtrack audio files that are ready-to-play, each compiled for a different user reading speed. The soundtrack server is configured to automatically select or the user may manually select a pre-compiled soundtrack audio file that most closely matches the user's reading speed and deliver that to the user device 102 over the network 108.

Hardware

The user device 102 may be any programmable electronic device. Typically, the user device has a processor 110, memory 111, a user interface 112 such as keyboard, mouse, touch display screen, control buttons, voice activation, or similar, a display or display screen 113, such as an LED display or similar, a communication module 114 for connecting to the soundtrack server 104 over a network 108 and an audio output 115 which can deliver sound to the user via integrated or external speakers, headphones, earphones or similar. The communication module may communicate with the soundtrack server over a network via any wired or wireless communication mediums, or a combination of these. For example, for smartphones the communication module may be the 3G or 4G cellular data connection, or alternatively a Wi-Fi connection to a broadband router. In the context of a personal computer, the communication medium may be hardwired or wireless connection to a local area network (LAN).

System Operation

In operation, the user device may be operable to access the soundtrack from the soundtrack server 104 via a soundtrack application or a multimedia application running on the user device as described with reference to FIGS. 3A-4. As previously described, the electronic media content may be either streamed from the soundtrack server, a separate $3^{rd}$ party server, or alternatively loaded locally by the user device in alternative configurations. For clarity, the description will focus on the soundtrack streaming aspect.

Soundtrack Selection

The user may select a soundtrack manually for the electronic media content from the soundtrack library on the soundtrack server which displays the soundtrack data files 116 available on the server. Alternatively, the soundtrack data file for the electronic media content may be automatically selected by the soundtrack server if it is also providing electronic media content or if the downloaded or stored media content from a third party server is known. The user device interacts with the soundtrack server via the control data stream 118.

A user reading speed setting may be then configured for the user. The user reading speed setting may be sent from the user device to the soundtrack server over the control data stream 118. Alternatively, the soundtrack server may store a user reading speed for the user based on historical user reading speed information from previous interactions.

In one form, the soundtrack server may comprise a soundtrack selector module 120 that is configured to maintain a user reading speed variable that represents the user's reading speed. The soundtrack selector module is configured to search the soundtrack database for a pre-compiled soundtrack audio file that most closely matches the user reading speed variable. In particular, the soundtrack database 106 comprises a library of soundtracks pre-compiled at different user reading speeds for each soundtrack data file 116 in the soundtrack library. By way of example only, the soundtrack database may comprise the soundtrack audio files that have been pre-compiled at reading speeds of say 200 words per minute (wpm), 250 wpm, 300 wpm, 350 wpm, 400 wpm, etc. Each of these pre-compiled soundtrack audio files will have a different duration that corresponds to the user reading speed for which it was compiled. The faster reading speeds having a shorter duration audio file than the slower reading speeds. Each of the pre-compiled soundtrack audio files 122 has a reading speed identifier that represents the reading speed for which it was compiled or produced. This reading speed identifier may be in the soundtrack file name, embedded or encoded in an associated header file or information of the audio file or may otherwise be stored in a data or folder structure that identifies the pre-compiled reading speed. The soundtrack selector 120 is configured to determine which pre-compiled soundtrack audio file 122 has a reading speed identifier or was pre-compiled at a reading speed that most closely matches the user reading speed variable. That selected soundtrack is then queued for streaming to the user device via the audio streaming module 124 of the soundtrack server.

In an alternative form, the user may simply review the pre-compiled soundtrack audio files in the database and select the soundtrack with a reading speed identifier to which they would like to receive without configuring a user reading speed variable in the soundtrack server.

Soundtrack Streaming

Once the pre-compiled soundtrack audio file 122 is selected, the audio streaming module 124 commences streaming of the pre-compiled soundtrack audio file on the audio data stream 126 over the network 108 to the user device 102. The audio stream 126 may commence at the start of the pre-compiled audio track or at an offset position within the pre-compiled soundtrack audio file corresponding to either the user's desired commencement reading position within the electronic media content. In one form, the user device 102 is configured to send control data 118 representing the user's desired commencement reading position in the electronic media content to the server 104 such that the incoming audio stream commences at that position within pre-compiled soundtrack audio file.

At the user device, the incoming audio stream 126 is received and stored temporarily in a buffer in memory ready for playback. The buffer size may be configured by the user device or alternatively by the soundtrack server, for example via header information provided in the audio stream. The buffer size may be configured or varied to suit the processing and data connection speed of the user device for example. If the buffer fills up or reaches full capacity, control data 118 is sent from the user device to the soundtrack server to halt the data transfer on the audio stream, until reinitiated by the user device when capacity becomes available in the buffer.

When the user begins reading the electronic media content, they may initiate playback over the audio output via direct control of the soundtrack player of the soundtrack application or multimedia application. By way of example, the soundtrack playback may be triggered via user interaction with soundtrack or multimedia application, such as generating a reading commencement signal by operation of a play button or similar in a graphical user interface (GUI) of the soundtrack or multimedia application. Likewise, the user may pause soundtrack playback via a pause button or similar in the GUI. Alternatively, the soundtrack playback initiation and pausing may be automatically controlled indirectly via the user's interaction with the electronic media content which may signal user reading commencement or pausing. In such embodiments, the soundtrack player may be a hidden background process not directly controllable by the user.

In one form, the buffer size or range is configurable relative to the current playback position within the audio stream. It may be as small or as large as the user desires within the capabilities of their user device, each having trade-offs. A small or no buffer may result in less data usage (in the context of mobile or broadband data allocation subscriptions) but higher likelihood of an interrupted or discontinuous soundtrack playback due to network delays and/or latency and no or minimal ability to re-synchronise to a new reading position quickly. A larger buffer provides a higher likelihood of a continuous soundtrack playback and more ability to re-synchronise to a new reading position quickly, but can result in higher data usage. The buffer extends forward of the current playback position and may optionally also extend behind the current playback position such that a played portion of the audio stream is retained in memory for a period of time. The buffer effectively is a sliding buffer about a reference point determined by the current playback position of the soundtrack within the audio stream.

Re-synchronising Soundtrack to a New Reading Position

Figure 5B:
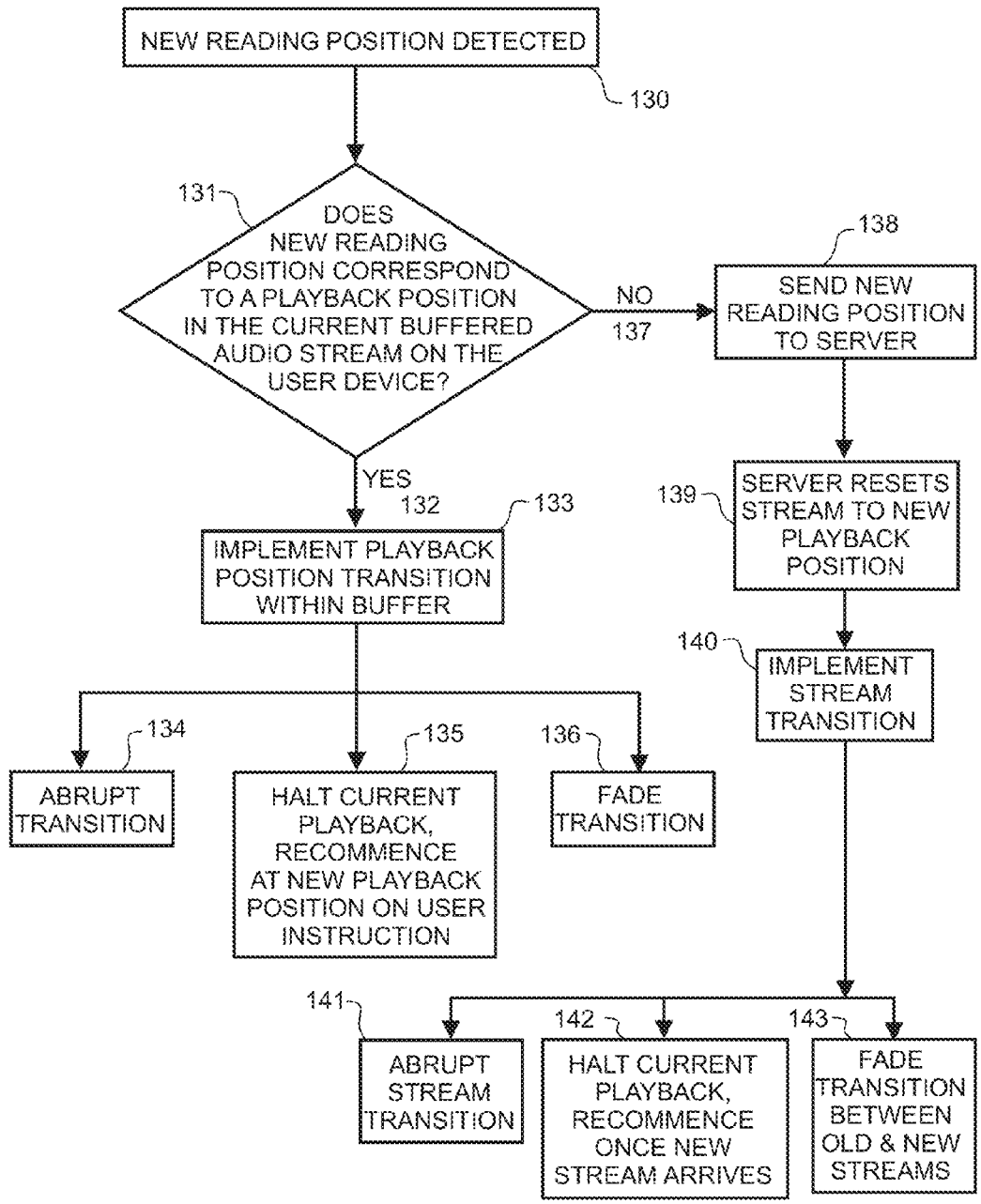
FIG. 5B is a flow diagram showing the re-synchronisation to a new reading position in the system of FIG. 5A.

Referring to FIGS. 5A and 5B, the user may operate the user device to generate data indicative of a new user reading position within the electronic media content that the user is reading, or this may be automatically detected by the user device based on user interaction. By way of example, the user may indicate a new reading position based on user interaction/input such as page turns, scrolling, arbitrary reading position update inputs etc. For example the user may jump or skip to a new page or portion of the electronic media content and begin reading from a new reading position.

Upon detecting a new reading position 130, the soundtrack application or multimedia application running on the user device is configured to determine whether the new user reading position is within the range of the buffered portion of the streamed soundtrack in memory 131.

If the new reading position is within the buffer range 132, then a pre-configured or configurable playback position transition is initiated 133. Various transition options are available. In one example, an abrupt transition 134 may be implemented such that the soundtrack playback abruptly skips or jumps to the new playback position and continues playback from that new position. In another example, a halt transition 135 may be implemented whereby the current playback is halted, and the soundtrack is cued for playback at the new position but awaits a user initiation (e.g. activation of a play button or similar) before re-commencing playback at the new position. In another example, a fade transition 136 may be implemented in which the current soundtrack playback position may progressively fade out with the new soundtrack playback position progressively fading in, like a cross-fade or alternatively the new soundtrack could be faded in only once the current soundtrack has been completely faded out.

If the new reading position is outside the buffered audio stream 137, such as likely when the user skips many pages or chapters of an e-book for example, the soundtrack application or multimedia application running on the user device may be configured to send control data 118 to the soundtrack server indicative of the new user reading position 138 and this may be optionally stored in a reading position module 109 in the server. In response, the audio streaming module resets the audio stream by halting the current data transfer 139 and re-commencing data transfer of the pre-compiled soundtrack at the new playback position that corresponds to the new current reading position. Upon receiving the new audio stream, the user device is configured to implement a stream transition protocol 140. Various transition options are available. In one example, an abrupt transition 141 may be implemented in which the soundtrack playback immediately jumps to the new audio stream upon arrival at the user device. In another example, a halt transition 142 may be performed in which the playback of the current stream is halted, the buffer cleared, and the new audio stream is buffered into the user device awaiting playback initiation by the user. In another example, a fade transition 143 may be implemented in which the current audio stream is progressively faded out while the new soundtrack is progressively faded in, like a cross-fade or the new audio stream may be faded in only once the current audio stream has been completely faded out or the two streams are matched by beat/tempo/content type so that the cross fade from old to new stream is seamless.

Changing Reading Speeds—Transition Protocols

The user's reading speed may increase or decrease during reading of the electronic media content. The soundtrack application or multimedia application on the user device may receive manual updates of changes to the user's reading speed, via the user selecting a new reading speed from a range or entering a new numerical reading speed or other user input indicative of a change in reading speed. Alternatively, the multimedia application which controls the display of the electronic media content and the soundtrack playback may automatically detect significant changes in the user reading speed.

Figure 5C:
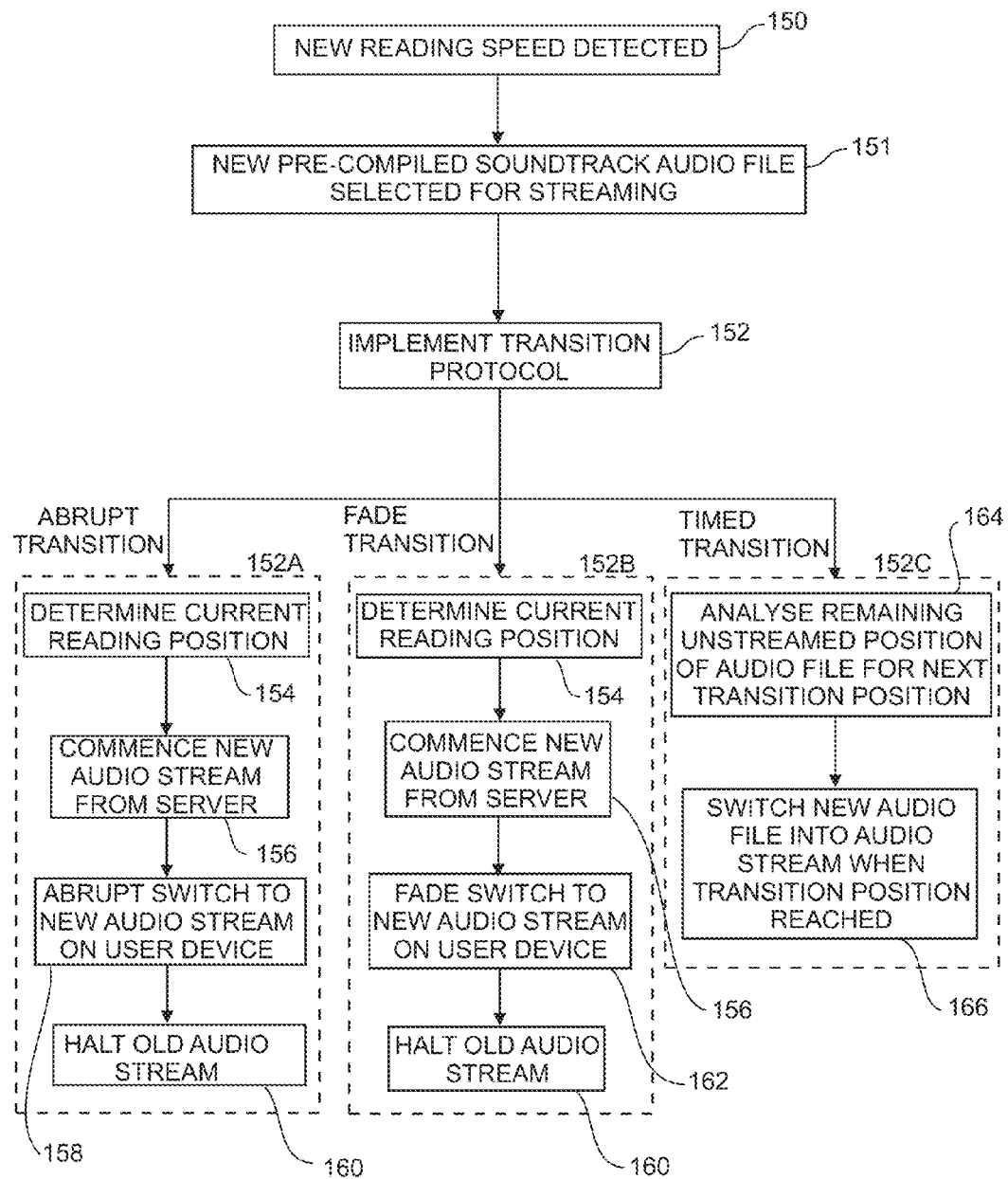
FIG. 5C is a flow diagram showing the transition protocols for a change in reading speed in the system of FIG. 5A.

Referring to FIGS. 5A and 5C, if a change in reading speed is detected 150, control data 118 indicative of the new reading speed is sent to the soundtrack server from the user device. The soundtrack server is configured to determine whether the currently selected pre-compiled soundtrack audio file should transition to another pre-compiled soundtrack audio file that more closely matches the new user reading speed. If a new pre-compiled soundtrack audio file is selected 151 for streaming, then a transition protocol 152 is executed by the soundtrack server to transition playback to the new pre-compiled soundtrack audio file. Various examples of possible transition protocols will be described in further detail for switching the synchronised soundtrack between a current and a new user reading speed. It will be appreciated that other transition protocols may also be implemented.

Abrupt Transition

In one example, the transition protocol may be an abrupt transition as will be described further with reference to the steps 152A. In the abrupt transition protocol, the user's current reading position in the electronic media content is determined at step 154. This may be determined via control data 118 sent from the user device to the soundtrack server for example. The soundtrack server then commences a new audio stream 156 corresponding to the new pre-compiled soundtrack audio file selected for the updated reading speed. The playback position of the new audio stream within the new pre-compiled soundtrack audio file corresponds to the user's current reading position as determined at step 154.

The new audio stream commenced at step 156 is in parallel to the current audio stream for the old reading speed. At the user device, upon receiving the new incoming audio stream, the user device clears the buffer and abruptly switches to the new audio stream and commences playback at step 158. Finally, the old audio stream is halted at step 160 by the server.

Fade Transition

In another example, the soundtrack server may implement a fade transition protocol as will be described with reference to steps 152B. In the fade transition protocol, steps 154, 156 and 160 are the same as carried out for the abrupt transition 152A. The primary difference is step 162 where the user device implements a fade switch to the new incoming audio stream. For example, upon receiving the new incoming audio stream, the user device is configured to progressively fade out the old audio stream, while concurrently fading in the new audio stream. Alternatively the old audio stream may be completely faded out before the new audio stream commences fade in.

Timed Transition Protocol

In another example, the soundtrack server may implement a timed transition protocol as will be described with reference to reference to steps 152C. In this timed transition protocol, the soundtrack server conducts an analysis of the remaining unstreamed (ie the data relating to the portion of the audio file that has not yet been transmitted from the server to the user device) portion of the pre-compiled soundtrack audio file in the current stream for an appropriate transition position. In one example, the soundtrack server may perform signal processing analysis of the unstreamed portion of the audio file to determine a lull or gap or period of silence. Alternatively, the server may analyse the corresponding soundtrack data file which contains the timing data for the audio regions in the pre-compiled audio file, and may analyse or calculate a next appropriate transition position based on preset transition parameters or criteria. By way of example, the transition criteria may dictate that the only appropriate transition positions are those in the soundtrack where there are no audio regions corresponding to effects and/or ambience, or alternatively no audio regions playing at all or through matching beat, tempo, or content type of audio tracks. Various transition criteria could be configured depending on the nature of the soundtrack including no transition or a default transition if no criteria can be easily or quickly met within a specified timeframe. The above transition analysis is performed at step 164. Once the next transition position is determined, the soundtrack server is configured to switch in the new pre-compiled audio file into the audio stream data transfer in place of the current audio file when the audio data relating to the transition position is reached 166. At the user device, a seamless transition from the old audio file at the old reading speed to the new audio file at the updated reading speed is experienced using audio techniques such as fade in, fade out, volume and equalizer matching and other audio processing techniques, unbeknown to the user.

4. Streaming of Real-time Compiled Soundtracks

Overview

Figure 6:
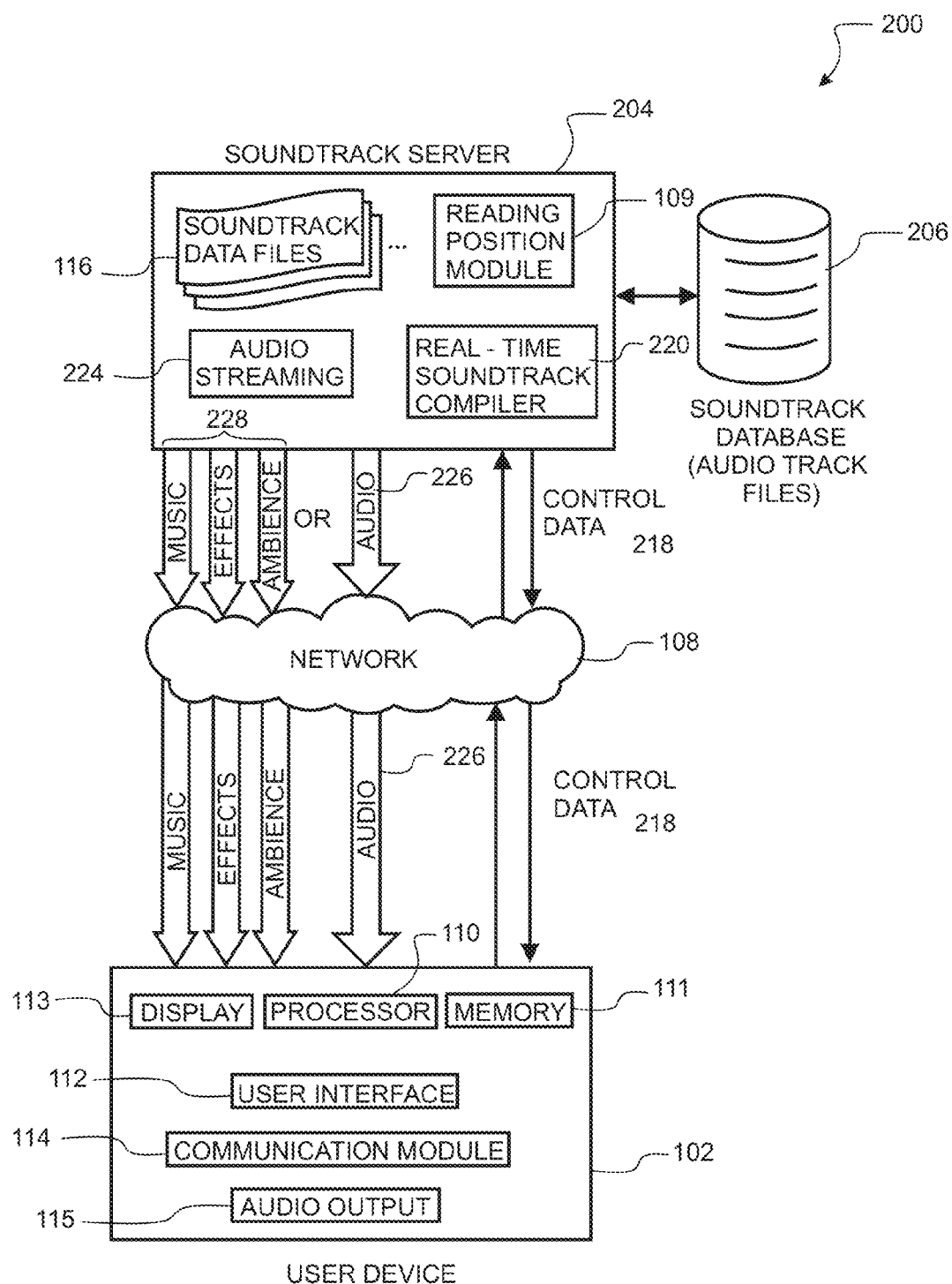
FIG. 6 is a schematic illustration of a soundtrack delivery system in accordance with a second form of the invention, the system delivering a real-time compiled soundtrack audio file over an audio stream from a soundtrack server to a remote device.

Referring to FIG. 6, a second form of the soundtrack delivery system 200 is configured to stream a real-time compiled soundtrack to the user device 102 from the soundtrack server 204. In this system configuration 200, the soundtrack server comprises a library of soundtrack data files 116 and an integrated or accessible soundtrack database 206 comprising the audio track files associated with the audio regions defined for all the soundtrack data files. In this system configuration 200, the soundtrack server 204 is provided with a real-time soundtrack compiler 220 that is configured to process the soundtrack data file for a selected soundtrack and to progressively compile or generate a compiled soundtrack audio file for streaming to the user in real-time or on demand. The soundtrack is compiled according to a configurable user reading speed setting corresponding to the user's reading speed.

As will be explained, the operation of the second form soundtrack delivery system 200 is substantially similar to that of the first form soundtrack delivery system 100, and like reference numerals represent like components and functionality in the drawings. The primary difference with the second form system 200 is that the compiled soundtrack is compiled or generated in real-time for a configured user reading speed from the selected soundtrack data file and audio track files associated with the audio regions defined in the soundtrack data file, as opposed to the soundtrack audio file being entirely pre-compiled as in the first form system 100. Otherwise, the system operation relating to the soundtrack selection, audio streaming, re-synchronisation to a new reading position, and transition protocols for changing reading speeds is substantially similar, as will be further explained.

Real-time Compiling and Soundtrack Streaming

Once a soundtrack is selected, the user device sends control data 218 to the soundtrack server 204 indicative of the user's reading speed and a desired commencement reading position within the electronic media content. Alternatively, the server 204 may retrieve the user's reading speed setting from historical stored data. The real-time soundtrack compiler 220 then commences compiling or production of an audio file representing the soundtrack commencing at the desired reading position and with audio region playback timing that corresponds to the user's configured reading speed setting. The soundtrack server is configured to progressively begin streaming the partially built or produced audio file of the soundtrack as it is being compiled via the audio streaming module 224 to the user device. In particular, the compiled portion of the soundtrack may be streamed simultaneously while the soundtrack compiler is compiling the remaining portion of the audio file in real-time to the customized user reading speed setting.

In one embodiment, the soundtrack compiler may produce a single audio file which is sent on a single audio stream 226 to the user device 102. In an alternative embodiment, the soundtrack compiler may produce two or more separate audio files 228 representing the soundtrack. For example, the soundtrack compiler may progressively produce a music audio file containing all the music audio regions, a sound effects audio file containing all the sound effects audio regions, and an ambience audio file containing all the ambience audio regions. All these audio files will have the same duration and may all be played back concurrently at the user device to recreate the soundtrack or a selection of the audio files may be played back concurrently to create a modified soundtrack in which only audio regions of a certain type are heard, with the others muted.

The extent to which the soundtrack compiler 320 compiles or produce the soundtrack in advance beyond that transferred to the user device may be configured or varied based on a variable compilation setting. For example, for faster readers the soundtrack compiler may compile more of the audio file in advance for streaming compared to slower readers. Alternatively, or additionally, control data 218 from the user device may control the amount of soundtrack being compiled in advance of the current portion transferred to the user device. For example, control data 218 from the user device indicating that the user's buffer is full, may cause the soundtrack compiler to pause compiling any further remaining portion of the audio file or files until receiving further control data indicating that the buffer has capacity.

Soundtrack Playback and Transitioning

Upon receiving the incoming audio stream or streams of the real-time compiled audio file or files, the user device buffers the audio data into memory and may commence and pause playback as previously described with reference to the first form system 100.

In regard to transitioning to a new reading position, the same sequence of operations as described with reference to FIG. 5B substantially apply in regard to the first form system 100, except with a few adjustments. In particular, if the new reading position is outside the buffer range, at step 139 the server may either reset the audio stream immediately to the new playback position if it is within the compiled but yet unstreamed portion of the audio file, or alternatively if the new playback position is beyond what has been compiled then the soundtrack compiler is configured to re-commence compiling of the soundtrack at the new position and then reset the audio stream to being transferring the new compiled portion of the audio file or files of the soundtrack. A stream transition protocol 140 may then be implemented as described in with reference to FIG. 5B.

In regard to changing reading speeds, the same sequence of operations as described with reference to FIG. 5C substantially apply in regard to the first form system 100, except with a few adjustments. When a new reading speed is detected 150, rather than the soundtrack server selecting a new pre-compiled soundtrack for streaming 151 as in the first form system 100, the soundtrack server in the second form 200 is configured to initiate the soundtrack compiler 220 to begin compiling a new audio file or files of the soundtrack is configured at the new reading speed. A transition protocol 152 for this new audio file or files of the soundtrack at the new reading speed may then be implemented as described with reference to FIG. 5C.

5. Streaming of Uncompiled Soundtracks

Overview

Figure 7:
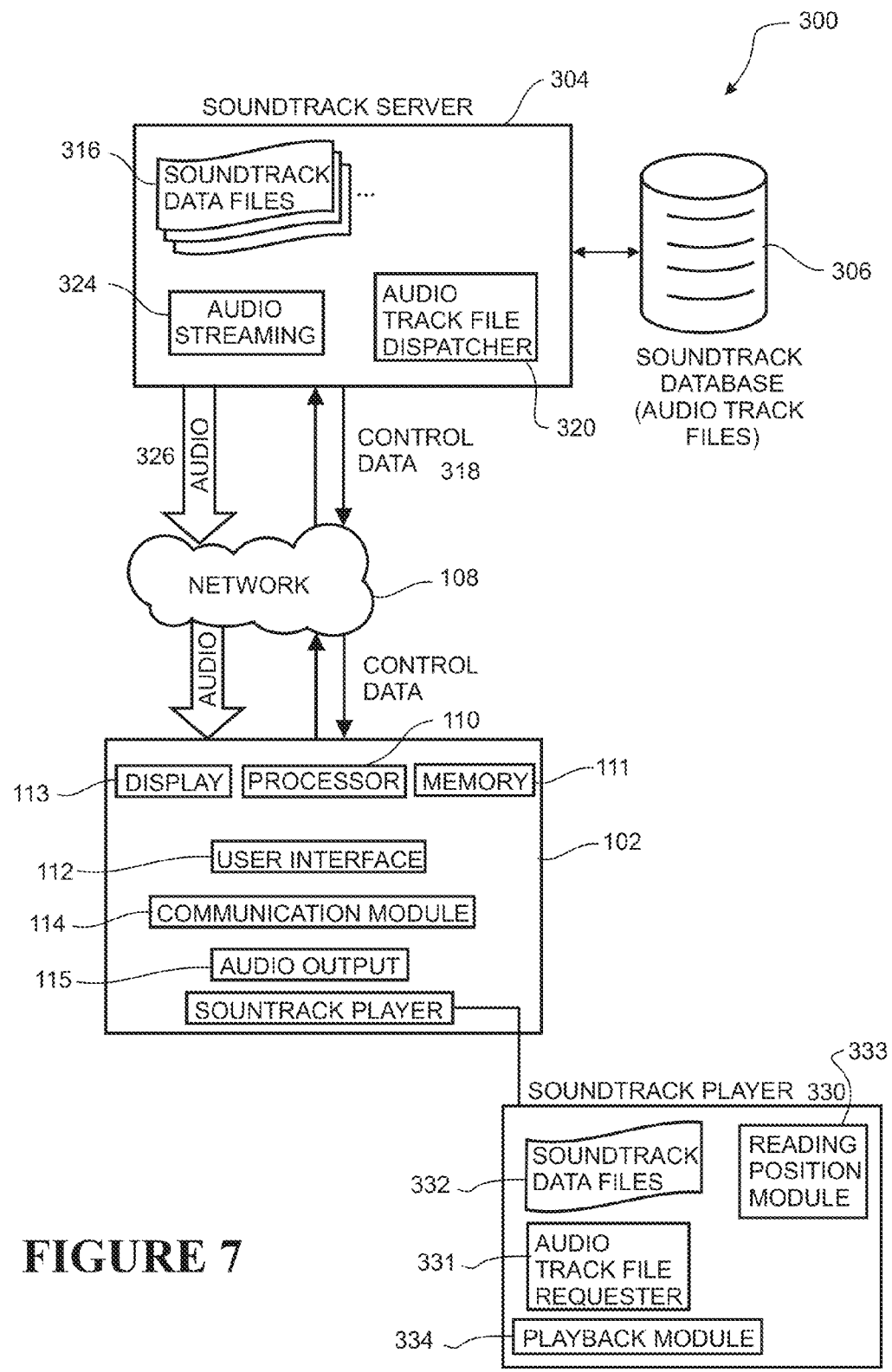
FIG. 7 is a schematic illustration of a soundtrack delivery system in accordance with a third form of the invention, the system delivering an uncompiled soundtrack over an audio stream from a soundtrack server to a remote user device.

Referring to FIG. 7, a third form of the soundtrack delivery system 300 is configured to stream an uncompiled soundtrack to the user device 102 from the soundtrack server 304. In this system configuration 300, the soundtrack server 304 comprises a library of soundtrack data files 316 and an integrated or accessible soundtrack database 306 comprising the audio track files associated with the audio regions defined for all the soundtrack data files. In operation, the soundtrack server is configured to stream, via the audio streaming module 324, the soundtrack data file and the audio track files to the user device 102 (like reference numerals representing like components and functionality previously described) over one or more audio data streams. The soundtrack application or multimedia application on the user device is provided with a soundtrack player 330 that is configured to process the soundtrack data file and control timed playback of the audio track files corresponding to the defined audio regions based on a user reading position variable indicative of the user's current reading position in the electronic media content.

Soundtrack Streaming

The user may select the soundtrack for streaming or this may be automatically selected by the soundtrack server if it is aware of the electronic media content being viewed by the user device, for example in configurations where the soundtrack server is in the form of a electronic media server providing the electronic media content in combination with the synchronized soundtrack. This interaction with the soundtrack server may occur via control data 318.

Once the soundtrack for streaming is selected, the entire soundtrack data file is firstly sent to the user device on the audio data stream 326. The soundtrack data file 332 is then processed by the soundtrack player. In particular, the soundtrack player comprises an audio track file requester module 331 that controls the progressive download of the audio track files associated with the soundtrack from the soundtrack server. The audio track file requester module 331 sends control data 318 to the audio track file dispatcher module 320 of the server requesting the required audio track files. In response to these requests, the dispatcher module 320 retrieves the requested audio track files from the soundtrack database and sends them to the user device on the audio data stream. The soundtrack player stores the requested audio track files in memory, ready for playback.

The soundtrack player comprises a reading position module 333 that maintains a user reading position variable (such as a counter as previously described) that is indicative of the user's expected or estimated reading position in the electronic media content. This user reading position variable increments or changes at a rate based on a configured user reading speed setting, and may be updated periodically or arbitrarily based on user interaction/input (e.g. page turns, scrolling, arbitrary reading position update inputs etc). The reading position module is also configured to receive control input indicative of the user commencing reading or pausing reading, and controls the reading position variable accordingly (eg starts or pauses the counter).

In a first form, the requester module 331 controls the progressive retrieval of the audio track files based on the user reading position variable and the downloaded soundtrack data file. In one example, the requester module processes the soundtrack data file to determine each next audio region due for playback based on the user reading position variable and requests the dispatcher module 320 in the server to send the audio track file for that next audio region on the audio data stream to the user device in advance ready for playback. This may be done one by one for each audio region or alternatively in batches or chunks of audio track files may be requested in advance for the next batch or chunk audio regions due for playback based on the user reading position variable. In another example, the requester module may process the soundtrack data file and maintain a sliding download window relative to the user reading position variable. In particular, the sliding download window may be a configurable size that extends from the user reading position variable. The requester module 331 may be configured to ensure it has requested all audio track files corresponding to any audio regions beginning within the sliding download window. The larger the window, the more audio track files are downloaded in advance of their playback and this reduces the likelihood of soundtrack playback interruption due to network delays.

In a second form, the requester module 331 may be configured to download all the audio track files associated with the soundtrack from the server, one by one in the order of the playback of their associated audio regions.

In a third form, the soundtrack may be divided into multiple pre-determined sections or portions, and this information may be embedded in the soundtrack data file. For example, in the context of a soundtrack for an e-book, the soundtrack may be divided into sections corresponding to each chapter of the e-book. In this form, the requester module 331 is configured to download the batch of audio files for each section entirely in advance of playback of that section. The requester module 331 may optionally be configured to also download the batch of audio files for one or more of the subsequent sections in advance during concurrent playback of the first downloaded section of audio files.

Soundtrack Playback

The soundtrack player 330 comprises a playback module 334 that is configured to process the soundtrack data file and trigger or cue playback of the audio track files associated with the defined audio regions of the soundtrack based on the user reading position variable maintained by the reading position module 333. In particular, the playback module commences playback of the audio track file associated with an audio region when the reading position variable matches the start position defined for that audio region, and stops playback of the audio track file when the reading position variable matches the stop position defined for that audio region, in a manner previously explained. It will be appreciated that two or more audio track files may be played concurrently when there are two or more overlapping audio regions and that each audio region can have other associated properties for playback that may or may not be dependent on reading speed such as volume and panning envelope control and other audio effects and properties, as described in WO2013/015694.

Purging and Retention Policy

In this embodiment, the requester module 331 is configured to delete audio track files stored in memory either after they are played or after a configurable predetermined time period, in case the user skips back to re-play a portion of the soundtrack. Additionally, the requester module 331 is configured to process the soundtrack data file to determine any audio regions that define the same audio track files. Such repeated audio track files are flagged for retaining in the memory of the user device until the last audio region has played.

Sourcing Audio Track Files from Different Sources

In the above examples, the requester module 331 is configured to request all the audio track files from the soundtrack server 304. In alternative embodiments, the soundtrack data file from the soundtrack server 304 may be configured to define one or more different sources or servers for at least some or all of the audio track files. In such embodiments the requester module 331 may download, stream or source the audio track files from the soundtrack server in combination with any other one or more servers or file sources or file services, whether remote from the user device or a music library or database stored locally on the user device, or alternatively may source all the audio track files from one or more servers or file sources or file services that are distinct and separate to the soundtrack server 304 providing the soundtrack data file. In one example, the user device, in accordance with the soundtrack data file, may obtain the bulk of the audio track files for audio regions relating to effects and ambience from the soundtrack server, and the audio track files for the music audio regions from a different music server or their own music library or database stored on the user device. In another example, the user device, in accordance with the soundtrack data file, may obtain all of the audio track files of the soundtrack from one or more sources separate to the soundtrack server 304, such as a file server, library or database accessible by or stored locally on the user device. The alternative sources to the soundtrack server 304 may be operated by the user or a different entity to the operator of the soundtrack server 304.

6. General

Embodiments of the invention may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In the foregoing, a storage medium may represent one or more devices for storing data, including read-only memory (ROM), random access memory (RAM), magnetic disk storage mediums, optical storage mediums, flash memory devices and/or other machine readable mediums for storing information. The terms "machine readable medium" and "computer readable medium" include, but are not limited to portable or fixed storage devices, optical storage devices, and/or various other mediums capable of storing, containing or carrying instruction(s) and/or data.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, circuit, and/or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

One or more of the components and functions illustrated the figures may be rearranged and/or combined into a single component or embodied in several components without departing from the invention. Additional elements or components may also be added without departing from the invention. Additionally, the features described herein may be implemented in software, hardware, or combination thereof.

In its various aspects, the invention can be embodied in a computer-implemented process, a machine (such as an electronic device, or a general purpose computer or other device that provides a platform on which computer programs can be executed), processes performed by these machines, or an article of manufacture. Such articles can include a computer program product or digital information product in which a computer readable storage medium containing computer program instructions or computer readable data stored thereon, and processes and machines that create and use these articles of manufacture.

The foregoing description of the invention includes preferred forms thereof. Modifications may be made thereto without departing from the scope of the invention as defined by the accompanying claims.

The invention claimed is:

1. A method of playing an uncompiled soundtrack on a user device for a reader of electronic media content, the uncompiled soundtrack representing a soundtrack defined by multiple audio regions, each audio region defined by: an audio track for playback in the audio region, a start position in the electronic media content corresponding to where the playback of the audio region is to begin, and a stop position in the electronic media content corresponding to where the playback of the audio region is to cease, the method comprising:
   sending control data to a remote server over a network requesting the soundtrack for playback;
   receiving a soundtrack data file from the remote server in response to the sent control data, the soundtrack data file defining the audio regions of the soundtrack;
   processing the soundtrack data file to determine at least the next audio region due for playback based on a user reading position variable indicative of the user's reading position in the electronic media content;
   sending periodic or arbitrary control data over a network to one or more remote audio track file sources requesting at least an audio track file corresponding to the next audio region due for playback;
   receiving and storing requested audio track files from the one or more remote audio track file sources in memory on the user device; and
   co-ordinating synchronized playback of the stored audio track files in memory as defined by their associated audio regions in the soundtrack data file based on the user reading position variable.

2. The method according to claim 1 wherein the soundtrack data file comprises source data indicative of the one or more audio track file sources to request each audio track file from.

3. The method according to claim 2 wherein the soundtrack data file defines a single audio track file source from which to request all the audio track files.

4. The method according to claim 2 wherein the soundtrack data file defines two or more different audio track file sources from which to request the audio track files.

5. The method according to claim 3 wherein the audio track file source is the remote server, and the method comprises requesting all audio track files from the remote server.

6. The method according to claim 4 wherein the audio track file sources comprise the remote server and one or more other audio track file sources, and the method comprises requesting the audio track files from the remote server or the one or more other audio track file sources based on the source data in the soundtrack data file.

7. The method according to claim 6 wherein some audio track files are sourced from the remote server, while other audio track files are sourced from one or more other audio track file sources.

8. The method according to claim 2 wherein the one or more audio track file sources are separate to the remote server, and the method comprises requesting all audio track files from the one or more separate audio track file sources such that all audio track files are sourced from somewhere other than the remote server.

9. The method according to claim 1 wherein the method comprises sending control data to the one or more audio track file sources requesting individual audio track files one by one.

10. The method according to claim 1 wherein the method comprises sending control data to the one or more audio track file sources comprising a single request for all audio track files associated with the audio regions of the soundtrack.

11. The method according to claim 1 wherein the method comprises sending control data to the one or more audio track file sources requesting batches of audio track files.

12. The method according to claim 1 wherein the method comprises maintaining a sliding download window relative to the user reading position variable, and sending control data to the one or more audio track file sources requesting all audio track files associated with audio regions falling within the sliding download window such that the all audio track files associated with audio regions in the sliding window are received and stored ready for future playback based on the user reading position variable.

13. The method according to claim 12 wherein size of the sliding download window is configurable.

14. The method according to claim 1 wherein the method further comprises deleting from memory the audio track files after their corresponding audio regions have completed playback either immediately or after a configurable predetermined delay.

15. The method according to claim 1 wherein the method further comprises analyzing the soundtrack data file for audio track files that are repeated in more than one audio region of the soundtrack, and tagging those audio track files as repeated audio tracks upon receipt and storage, and further retaining each such repeated audio tracks in memory until the last audio region associated with the audio track has completed playback.

16. The method according to claim 1 wherein the soundtrack data file comprises, for each audio region, data indicative of:
   an audio track for playback in the audio region;
   a start position in the electronic media content corresponding to a word in the electronic media content at which the playback of the audio region is to begin; and
   a stop position in the electronic media content corresponding to a word in the electronic media content at which the playback of the audio region is to cease, and wherein the user reading position variable is indicative of the word in the electronic media content the user is estimated to be reading.

17. The method according to claim 16 wherein the method further comprises maintaining a user reading position variable indicative of the word in the electronic media content the user is estimated to be reading.

18. The method according to claim 17 wherein the method further comprises displaying the electronic media content on a display associated with the user device.

19. A user device for playing an uncompiled soundtrack for a reader of electronic media content, the uncompiled soundtrack representing a soundtrack defined by multiple audio regions, each audio region defined by: an audio track for playback in the audio region, a start position in the electronic media content corresponding to where the playback of the audio region is to begin, and a stop position in the electronic media content corresponding to where the playback of the audio region is to cease, the user device comprising:
   a user interface configured to receive user input to control the device;
   an audio output system that is operable to generate audio output for the user to hear; and
   a processor configured to:
      send control data to a remote server over a network requesting the soundtrack for playback;
      receive a soundtrack data file from the remote server in response to the sent control data, the soundtrack data file defining the audio regions of the soundtrack;
      process the soundtrack data file to determine at least the next audio region due for playback based on a user reading position variable indicative of the user's reading position in the electronic media content;
      send periodic or arbitrary control data over a network to one or more remote audio track file sources requesting at least an audio track file corresponding to the next audio region due for playback;
      receive and store requested audio track files from the one or more remote audio track file sources in memory on the user device; and
      co-ordinate synchronized playback of the stored audio track files in memory as defined by their associated audio regions in the soundtrack data file based on the user reading position variable.

20. The user device according to claim 19 wherein the soundtrack data file comprises, for each audio region, data indicative of:
   an audio track for playback in the audio region;
   a start position in the electronic media content corresponding to a word in the electronic media content at which the playback of the audio region is to begin; and
   a stop position in the electronic media content corresponding to a word in the electronic media content at which the playback of the audio region is to cease, and wherein the user reading position variable is indicative of the word in the electronic media content the user is estimated to be reading.

21. The user device according to claim 20 wherein the processor is further configured to maintain a user reading position variable indicative of the word in the electronic media content the user is estimated to be reading.

22. The user device according to claim 21 further comprising a display configured to display the electronic media content.

* * * * *